(12) United States Patent
Kawabata

(10) Patent No.: US 8,719,851 B2
(45) Date of Patent: May 6, 2014

(54) DATA STORAGE DEVICE

(75) Inventor: Toru Kawabata, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/444,289

(22) Filed: Apr. 11, 2012

(65) Prior Publication Data

US 2013/0055297 A1 Feb. 28, 2013

(30) Foreign Application Priority Data

Aug. 31, 2011 (JP) .................................. 2011-188428

(51) Int. Cl.
*G11B 15/18* (2006.01)

(52) U.S. Cl.
USPC ........................................................ 720/649

(58) Field of Classification Search
USPC .......... 720/649, 603, 651, 619, 677, 672, 648
See application file for complete search history.

(56) References Cited

U.S. PATENT DOCUMENTS

| | | | |
|---|---|---|---|
| 5,946,010 A | 8/1999 | Isobe et al. | |
| 6,125,090 A * | 9/2000 | Nakamichi | 720/622 |
| 7,167,360 B2 * | 1/2007 | Inoue et al. | 361/679.34 |
| 7,315,447 B2 * | 1/2008 | Inoue et al. | 361/679.48 |
| 7,315,452 B2 * | 1/2008 | Eguchi | 361/714 |
| 7,581,233 B2 * | 8/2009 | Ueno et al. | 720/690 |
| 7,610,591 B2 * | 10/2009 | Wan et al. | 720/677 |
| 7,644,419 B2 * | 1/2010 | Shizuya et al. | 720/652 |
| 7,986,495 B2 * | 7/2011 | Kamei et al. | 360/246 |
| 8,254,231 B2 * | 8/2012 | Iriyama | 369/53.17 |
| 8,284,640 B2 * | 10/2012 | Toyoda et al. | 369/44.15 |
| 8,362,365 B2 * | 1/2013 | Ho et al. | 174/261 |
| 2007/0107000 A1 * | 5/2007 | Peng | 720/600 |
| 2007/0124746 A1 * | 5/2007 | Shizuya et al. | 720/649 |
| 2009/0185793 A1 * | 7/2009 | Goto et al. | 386/124 |
| 2009/0211787 A1 * | 8/2009 | Kamei et al. | 174/250 |
| 2009/0242259 A1 * | 10/2009 | Ho et al. | 174/261 |
| 2009/0268587 A1 * | 10/2009 | Toyoda et al. | 369/112.23 |
| 2010/0157469 A1 * | 6/2010 | Ichikawa et al. | 360/97.02 |
| 2010/0259736 A1 | 10/2010 | Kinjo et al. | |
| 2011/0011626 A1 * | 1/2011 | Yamauchi et al. | 174/250 |
| 2011/0128835 A1 * | 6/2011 | Iriyama | 369/47.49 |
| 2011/0259632 A1 * | 10/2011 | Oosawa et al. | 174/266 |
| 2011/0279928 A1 * | 11/2011 | Miura et al. | 360/244.3 |
| 2012/0241200 A1 * | 9/2012 | Chiyonaga et al. | 174/255 |
| 2012/0320727 A1 * | 12/2012 | Matsumiya et al. | 369/112.03 |

(Continued)

FOREIGN PATENT DOCUMENTS

| | | | |
|---|---|---|---|
| JP | 03-071491 U | | 7/1991 |
| JP | 2005327355 A | * | 11/2005 |
| JP | 2006-286070 A | | 10/2006 |

OTHER PUBLICATIONS

Co-pending U.S. Appl. No. 13/444,053 filed Apr. 11, 2012.

*Primary Examiner* — Allen T Cao

(74) *Attorney, Agent, or Firm* — Renner, Otto, Boisselle & Sklar, LLP

(57) ABSTRACT

In one embodiment of a data storage device, the inside of its housing 111 is divided into first and second spaces 1 and 2 by a chassis 110. The data storage device includes at least one optical pickup 104 that writes data on a storage medium and a heat radiating member 109 which is thermally coupled to the optical pickup 104 to transfer the heat generated by the optical pickup 104. The optical pickup 104 and the heat radiating member 109 are arranged in the first and second spaces 1 and 2, respectively.

13 Claims, 17 Drawing Sheets

(56) References Cited

U.S. PATENT DOCUMENTS

| | | | |
|---|---|---|---|
| 2013/0077456 A1* | 3/2013 | Takahashi et al. | 369/53.23 |
| 2013/0077458 A1* | 3/2013 | Itoh et al. | 369/112.23 |
| 2013/0083640 A1* | 4/2013 | Takahashi et al. | 369/53.26 |
| 2013/0088948 A1* | 4/2013 | Kayama et al. | 369/112.03 |
| 2013/0094337 A1* | 4/2013 | Yajima et al. | 369/44.23 |
| 2013/0229729 A1* | 9/2013 | Yamazaki | 360/244.2 |

* cited by examiner (a)

(b)

(c)

(d)

DATA STORAGE DEVICE

BACKGROUND OF THE INVENTION

1. Field of the Invention

The present disclosure generally relates to a data storage device and more particularly relates to a data storage device that is specially designed to dissipate the heat, generated by an optical pickup, out of the data storage device itself.

2. Description of the Related Art

In an optical disc drive, the lens, prism, semiconductor laser diode and other members of its optical pickup can be used only within limited temperature ranges. In the meantime, as there are increasing demands for even higher writing speeds, the quantity of the heat generated by the optical pickup tends to rise these days.

To cope with such a problem, Japanese Laid-Open Utility Model Publication No. 3-71491 discloses a structure that transfers the heat generated by the optical pickup to a radiator, which is arranged outside of the housing, via a thermally conductive material, thereby dissipating the heat.

Meanwhile, Japanese Patent Application Publication No. 2006-286070 discloses an apparatus for writing data on an optical tape (tape medium) using multiple optical pickups. However, the larger the number of optical pickups used, the greater the quantity of heat generated.

In the structure disclosed in Japanese Laid-Open Utility Model Publication No. 3-71491, the radiator that is arranged outside of the housing is located too distant from the optical pickup to transfer the heat to the radiator effectively. On the other hand, to write data on an optical tape using multiple optical pickups, those optical pickups need to be positioned with higher accuracy.

It is therefore an object of the present invention to provide a data storage device that can transfer the heat to a radiator effectively. Another object of the present invention is to position multiple optical pickups with higher accuracy.

SUMMARY OF THE INVENTION

A data storage device according to one aspect of the present invention includes: a housing; a plate member that divides the inside of the housing into first and second spaces; at least one optical pickup which is arranged in the first space and which is configured to write data on a storage medium in the first space; and a heat radiating member which transfers the heat that has been generated by the optical pickup to the second space.

In one embodiment of the present invention, the housing has a plurality of openings, through which the second space communicates with the outside of the drive.

In another embodiment, the at least one optical pickup includes a number of optical pickups that are arranged at regular intervals.

In a specific embodiment, the storage medium is a tape medium, and the data storage device further includes: guide posts that guide the tape medium in the first space; a spool that winds the tape medium in the first space; and a motor that rotates the spool. And the optical pickups are arranged in a direction in which the tape medium runs.

In another embodiment, the optical pickups are arranged at mutually different positions in the width direction of the tape medium.

In this particular embodiment, the optical pickups are secured to a flat plate or a straight rod member that tilts in the width direction of the tape medium.

In still another embodiment, the heat radiating member is at least partially exposed in the second space.

In yet another embodiment, a gap is left between the heat radiating member and each of the optical pickups and is filled with a thermally conductive material with flowability.

In yet another embodiment, the plate member is arranged to support the optical pickup and the heat radiating member.

In a specific embodiment, the plate member functions as at least a part of the heat radiating member.

In yet another embodiment, the optical pickups are attachable and removable to/from the data storage device.

In yet another embodiment, the plate member has a hole, through which the heat radiating member is thermally coupled to the optical pickup.

In yet another embodiment, the data storage device further includes a blower fan which is arranged in the second space, and the heat generated by the optical pickup is dissipated out of the data storage device with the air blown by the blower fan.

An optical pickup assembly according to another aspect of the present invention includes: a plurality of pickup parts; and a positioning mechanism which positions the pickup parts that are arranged in a tilt direction that defines a tilt angle with respect to a direction in which a storage medium runs. The positioning mechanism includes: a first regulating member which is arranged to allow each of the pickup parts to move in the tilt direction; and a second regulating member which regulates the position of each said pickup part in the direction in which the storage medium runs.

In one embodiment of the present invention, the first regulating member is a flat plate or rod that runs straight.

In this particular embodiment, the optical pickup assembly further includes a fixing jig that fixes the first regulating member in the tilt direction.

In a specific embodiment, the fixing jig is configured to change the tilt angle of the first regulating member.

In another embodiment, the second regulating member has a plurality of surfaces, each of which contacts with an associated one of the pickup parts and which determine the positions of the pickup parts in the direction in which the storage medium runs.

In still another embodiment, the second regulating member has a surface that contacts with one of the pickup parts.

In this particular embodiment, the second regulating member has a number of spacers, each of which is inserted between associated two of the pickup parts and which determine the positions of the pickup parts in the direction in which the storage medium runs.

In another embodiment, the second regulating member has a plurality of counter surfaces, each of which confronts an associated one of the pickup parts. And those counter surfaces are arranged stepwise in the direction in which the storage medium runs. And a gap is left between the pickup parts and the counter surfaces.

In a specific embodiment, the gap between the pickup parts and the counter surfaces is filled with a thermally conductive material with flowability.

Another data storage device according to the present invention includes: an optical pickup assembly according to any of the embodiments of the present invention described above; a motor that runs an optical tape; and a read/write circuit which read and writes data from/on the optical tape.

This description discloses a data storage device that can transfer heat to a radiator effectively.

Other features, elements, processes, steps, characteristics and advantages of the present invention will become more apparent from the following detailed description of embodiments of the present invention with reference to the attached drawings.

DETAILED DESCRIPTION OF EMBODIMENTS

Hereinafter, embodiments of a data storage device according to the present invention will be described. A data storage device as an embodiment of the present invention is an optical data streamer apparatus that uses an optical tape as a storage medium. Such an optical data streamer apparatus may be used to back up a huge quantity of data. In order to back up such an enormous quantity of data in a short time with the transfer rate increased, the optical data streamer apparatus includes a lot of optical pickup devices.

Figure 1A:
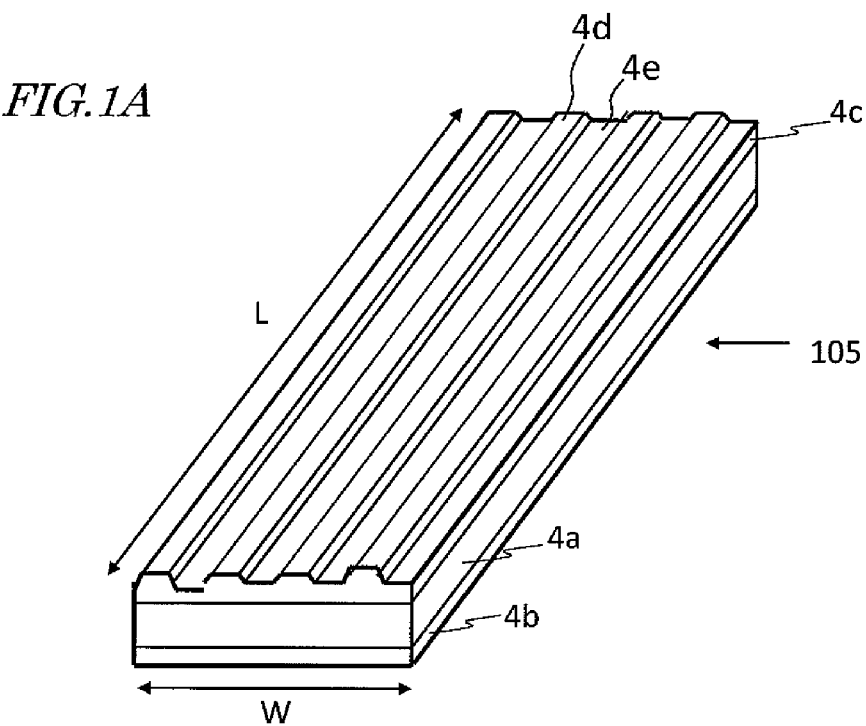
FIG. 1A is a perspective view schematically illustrating a portion of an optical tape 105 on a larger scale.

FIG. 1A is a perspective view schematically illustrating a portion of an optical tape 105 on a larger scale. The optical tape 105 may include a base film 4a, a back coating layer 4b that is adhered to the back surface of the base film 4a, and an imprint layer 4c that is supported by the base film 4a. On the upper surface of the imprint layer 4c, lands 4d and grooves 4e have been formed. Although not shown in FIG. 1A, a reflective film and a recording material film are deposited over the entire upper surface of the imprint layer 4c. The optical tape 105 is extended in the longitudinal direction L and may have a length of several hundred meters, for example. Its width W may be set within the range of a few millimeters to several centimeters, and its thickness may be within the range of a few micrometers to several ten micrometers.

It should be noted that FIG. 1A illustrating the optical tape 105 is not to scale. Actually, the optical tape 105 may have several hundreds, or an even greater number, of lands 4d and grooves 4e. In one embodiment of the present invention, data is written on either the lands 4d or the grooves 4e. The lands 4d or the grooves 4e on which data is written will be referred to herein as "tracks", which may have a pitch of 0.2 μm to 0.4 μm, for example.

Figure 1B:
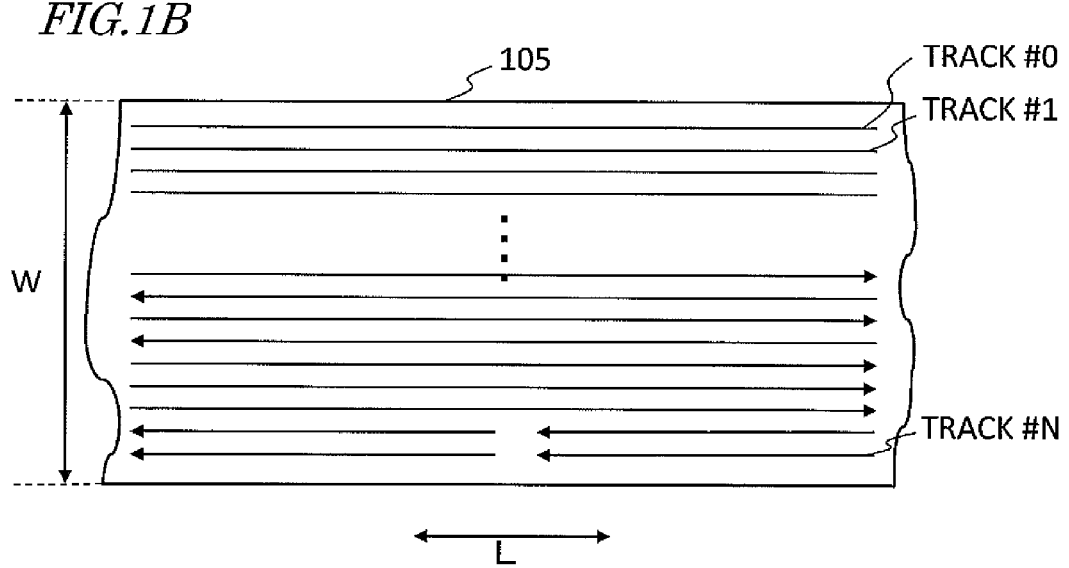
FIG. 1B is a plan view schematically illustrating a portion of the optical tape 105.

FIG. 1B is a plan view schematically illustrating a portion of the optical tape 105. As shown in FIG. 1B, N (which is an integer that is typically equal to or greater than 100) tracks #0 through #N have been formed to run in the longitudinal direction L. Some of those tracks illustrated in FIG. 1B are illustrated with an arrow. Each of those arrows indicates the direction in which data is written. That is to say, data can be written in multiple different directions on a single optical tape 105.

On the optical tape 105, a mark can be recorded optically by irradiating the tape 105 with a light beam. More specifically, such a mark is recorded on its recording material film. The light beam is radiated by an "optical pickup" that includes a light source and an objective lens that focuses the light beam emitted from the light source on the optical tape 105. When the optical pickup irradiates the optical tape 105 with a light beam, the irradiated portion of the optical tape 105 comes to have a different optical property such as a refractive index from the rest (i.e., the non-irradiated portion) of the optical tape 105. Such a portion, of which the optical property has changed in this manner, is called a "recorded mark".

In optical tape technologies, data can be read out from the optical tape 105 by irradiating the tape 105 with a relatively weak light beam with a constant intensity and detecting the light that has been modulated by, and reflected from, the optical tape 105. In writing data on the optical tape 105, data is written there by irradiating the optical tape 105 with a pulsed light beam, of which the optical power has been changed according to the data to be written, and locally changing the property of the recording material film.

When data is going to be written on the recording material film of the optical tape 105, the recording material film is irradiated with such a light beam, of which the optical power has been modulated as described above, thereby recording an amorphous mark on a crystalline recording material film. Such an amorphous recorded mark is left there by heating a portion of the recording material film that has been irradiated with a writing light beam to a temperature that is equal to or higher than its melting point and then rapidly cooling that portion. If the optical power of a light beam that irradiates the recorded mark is set to be relatively low, the temperature of the recorded mark being irradiated with the light beam does not exceed its melting point and the recorded mark will turn crystalline again after having been cooled rapidly (i.e., the recorded mark will be erased). In this manner, the recorded mark can be rewritten over and over again. However, if the power of the light beam for writing data had an inappropriate level, then the recorded mark would have a deformed shape and sometimes it could be difficult to read the data as intended.

To read or write data from/on the optical tape 105, the light beam always needs to maintain a predetermined converging state on a target track. For that purpose, a "focus control" and a "tracking control" need to be done. The "focus control" means controlling the position of an objective lens along a normal to the surface (i.e., recording surface) of the optical tape 105 so that the focal point (or at least the converging point) of the light beam is always located on the target track. On the other hand, the "tracking control" means controlling the position of the objective lens parallel to the surface (recording surface) of the optical tape 105 and perpendicularly to the track so that the light beam spot is always located right on the target track.

In order to perform such a focus control or a tracking control, the focus error or the tracking error needs to be detected based on the light that has been reflected from the optical tape 105 and the position of the light beam spot needs to be adjusted so as to reduce the error as much as possible. The magnitudes of the focus error and the tracking error are respectively represented by a "focus error (FE) signal" and a "tracking error (TE) signal", both of which are generated based on the light that has been reflected from the optical tape 105.

Figure 2A:
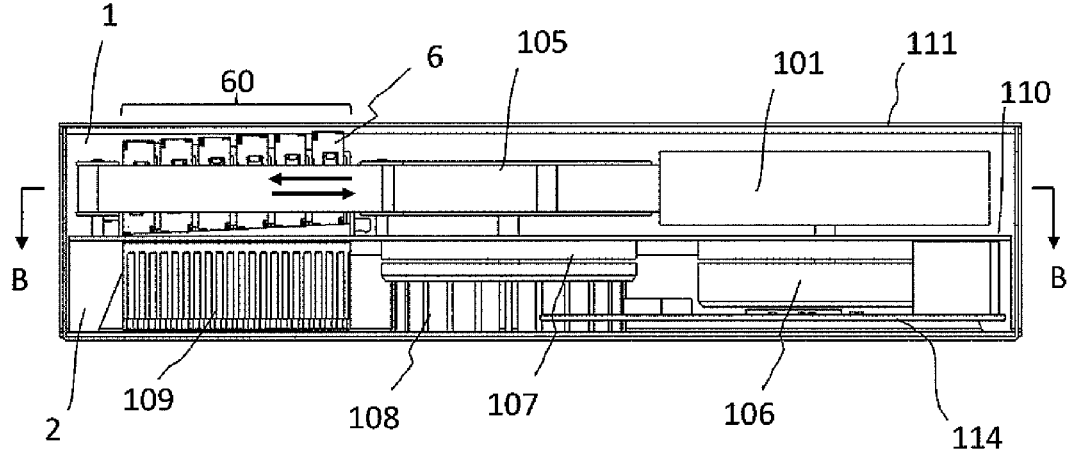
FIG. 2A illustrates an exemplary arrangement for an optical data streamer apparatus as an embodiment of the present invention.

FIG. 2A illustrates an exemplary arrangement for an optical data streamer apparatus as an embodiment of the present invention, and FIG. 28 is a cross-sectional view of the apparatus as viewed on the plane B-B shown in FIG. 2A. In the embodiment illustrated in FIG. 2A, the upside corresponds to perpendicularly upside, and the downside corresponds to perpendicularly downside. Thus, FIG. 2B illustrates an exemplary internal arrangement of this optical data streamer apparatus as viewed from right over the apparatus.

Figure 2B:
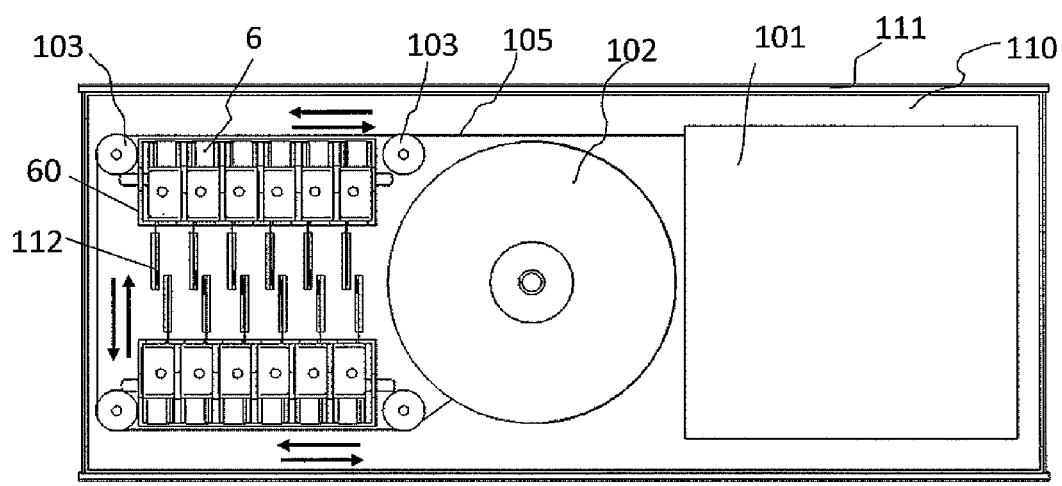
FIG. 2B is a cross-sectional view of the apparatus as viewed on the plane B-B shown in FIG. 2A.

FIGS. 2A and 2B illustrate a situation where the apparatus is loaded with a tape cartridge 101 in which the optical tape 105 is housed. The tape cartridge 101 is readily attachable and removable to/from the apparatus. And the optical data streamer apparatus shown in FIGS. 2A and 2B is loaded with a selected one of multiple tape cartridges 101 that have the same shape.

The optical data streamer apparatus of this embodiment includes a housing 111, a chassis 110 that divides the internal space of the housing 111 into first and second spaces 1 and 2, a plurality of pickup parts 6 that are arranged in the first space 1 so as to write data on the optical tape 105 inside the first space 1, and a radiator 109 that transfers the heat that has been generated by the pickup parts 6 to the second space 2. Those pickup parts 6 are positioned by a positioning mechanism provided for an optical pickup assembly 60. The housing 111 has a plurality of openings, through which the second space 2 communicates with the outside of this apparatus.

More specifically, this optical data streamer apparatus includes motors 106 and 107 that make the optical tape 105 run, guide posts 103 and a winding spool 102. The motor 107 is mechanically interlocked with the winding spool 102 that winds the optical tape 105 and turns the winding spool 102. On the other hand, the motor 106 is mechanically interlocked with the shaft of the tape cartridge 101 loaded and operates so as to wind the tape 105, which has been pulled out of the tape cartridge 101, back to the tape cartridge 101. Using these two motors 106 and 107, the tape 105 can run in both of the two directions that are indicated by the arrows.

The data streamer apparatus further includes an optical pickup unit 60 that accesses optically the optical tape 4 running. The optical pickup unit 60 includes a number of optical pickup devices 6 that are arranged in the direction in which the optical tape 4 runs. The structure of each of those optical pickup devices 6 will be described in detail later. The optical pickup unit 60 of this embodiment includes upper and lower arrays of optical pickup devices 6. However, the optical pickup unit 60 does not have to have such a configuration. Each of those optical pickup devices 6 includes a light source that emits a light beam, an objective lens that converges the light beam onto the tape 4, a lens actuator that drives the objective lens, and a photodetector that senses the light reflected from the optical tape 4 and generates necessary signals. The optical pickup devices 6 are connected to a circuit board (not shown) with wiring. And the circuit board has a circuit block that controls the optical pickup devices 6 and the motors 2 and 3.

The optical pickup assembly 60 includes a number of pickup parts 6, which are arranged in the direction in which the optical tape 105 runs. The structure of each of those pickup parts 6 will be described in detail later. The optical pickup assembly 60 of this embodiment has upper and lower arrays of pickup parts 6 and is thermally coupled to the radiator 109. In the second space 2, arranged is a blower fan 108 that blows an air to the radiator 109 and that is mechanically coupled to the motor 107. That is why as the motor 107 turns, the blower fan 108 turns, too.

Each pickup part 6 has a single or multiple optical pickups. In this embodiment, each pickup part has two optical pickups as will be described later. Each of those optical pickups 6 includes a light source that emits a light beam, an objective lens that converges the light beam onto the tape 105, a lens actuator that drives the objective lens, and a photodetector that senses the light reflected from the optical tape 105 and generates necessary signals. The pickup parts 6 are connected to flexible printed circuit boards (FPCs) 112 for optical pickups. This optical data streamer apparatus further includes a circuit board (not shown but to be described later) that is connected to the flexible printed circuit boards 112 and that includes circuit components that control the pickup parts 6 and the motors 106 and 107. Optionally, the pickup parts 6 and a circuit that would normally be mounted on another circuit board could be partially arranged on the flexible printed circuit boards 112.

Hereinafter, an exemplary circuit configuration for an optical data streamer apparatus according to this embodiment will be described with reference to FIG. 3.

Figure 3:
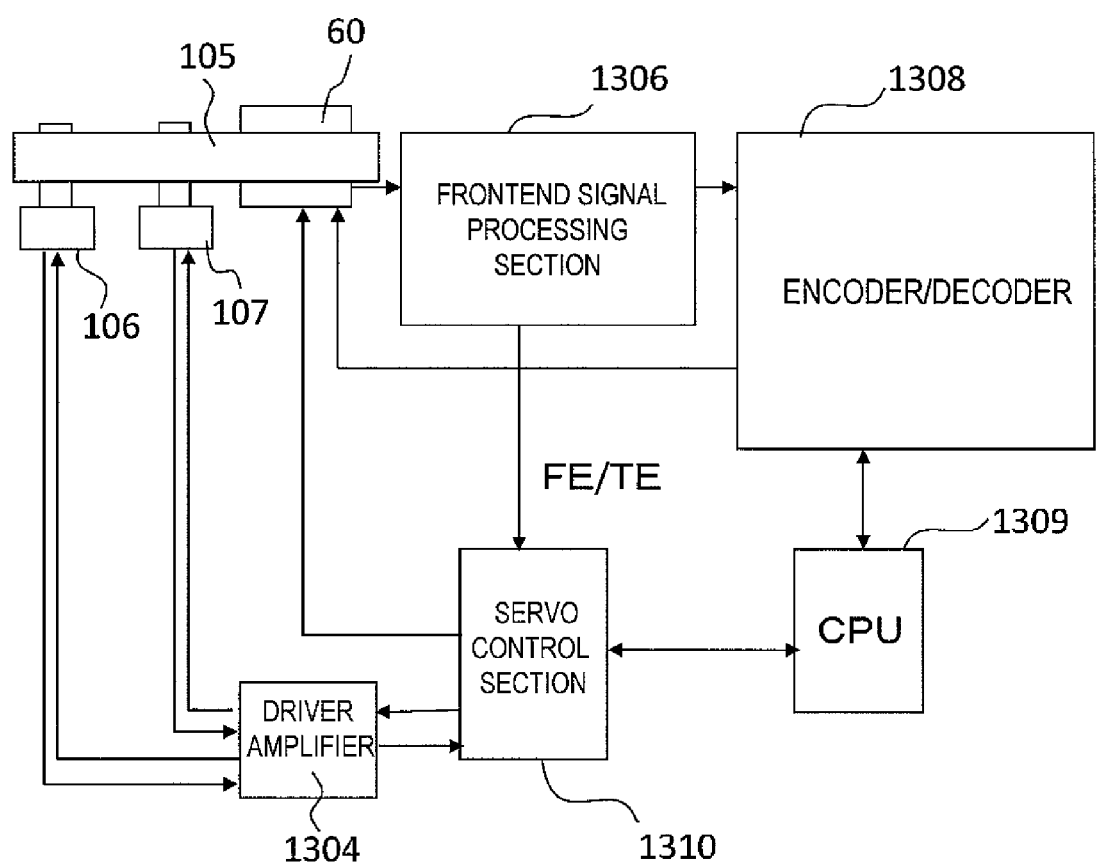
FIG. 3 illustrates an exemplary circuit configuration for an optical data streamer apparatus according to an embodiment of the present invention.

The optical data streamer apparatus illustrated in FIG. 3 includes circuit blocks that are electrically connected to the optical pickup assembly 60 and motors 106 and 107.

In the exemplary configuration shown in FIG. 3, the output of the optical pickup assembly 60 is supplied to an encoder/decoder 1308 by way of a frontend signal processing section 1306. In reading data, the encoder/decoder 1308 decodes the data that is stored on the optical tape 105 based on the signal that has been generated by the optical pickup assembly 60. In writing data, on the other hand, the encoder/decoder 1308 encodes the data to generate a signal to be written on the optical tape 105 and outputs the signal to the optical pickup assembly 60.

The frontend signal processing section 1306 generates a read signal, a focus error signal FE and a tracking error signal TE based on the output of the optical pickup assembly 60. The focus error signal FE and the tracking error signal TE are then supplied to a servo control section 1310. In response, the servo control section 1310 gets the motors 106 and 107 controlled by a driver amplifier 1304. The servo control section 1310 also gets the position of an objective lens controlled by a lens actuator in the optical pickup assembly 60. The encoder/decoder 1308, the servo control section 1310 and all the other components are controlled by a CPU 1309. The blocks illustrated in FIG. 3 can be implemented by assembling together integrated circuit elements, memories and other electronic circuit components on a circuit board.

The recording surface of the optical tape 105 that can be used in this embodiment may have a width of about 10 mm, for example. In that case, data can be read and written from/on the running optical tape 105 over the entire width thereof by twenty-four optical pickups, for example.

Before the tape cartridge 101 is loaded into this optical data streamer apparatus, the optical tape 105 housed in the tape cartridge 101 has been wound around a spool (not shown). And when the tape cartridge 101 is loaded into the optical data streamer apparatus, the optical tape 105 is pulled out while being guided by a number of tape guide posts 103 and then wound around the winding spool 102. Each of the pickup parts 6 is fixed at a predetermined position with respect to the optical tape 105 so as to read and write information from/on the optical tape 105. In this embodiment, twenty-four optical pickups are provided, and therefore, data can be read and written simultaneously by using a maximum of twenty-four optical pickups. It should be noted that the number of optical pickups provided for a single optical data streamer apparatus does not have to be, and may be greater or smaller than, twenty-four.

The feed motor 107 drives and turns the winding spool 102, thereby running the optical tape 105 in the forward direction. At the same time, the feed motor 107 also drives the blower fan 108 to blow an air to the radiator 109. On the other hand, the reverse motor 106 drives and turns a spool (not shown) in the tape cartridge 101, thereby running the optical tape 105 in the reverse direction. In the meantime, as the winding spool 102 is also driven by the optical tape 105, the blower fan 108 is turned, too. As the pickup parts 6 are thermally coupled to the radiator 109, the heat generated by the pickup parts 6 is transferred to the radiator 109. The majority of the radiator 109 is located in the second space 2 (i.e., under the chassis 110). And all of these members are attached to the chassis 110 in a plate shape. This respect will be described later.

A hole has been cut through the chassis 110 in order to thermally couple the pickup parts 6 to the radiator 109. And an upper portion of the radiator 109 is located over the chassis 110 (i.e., in the first space 1). Also, all of these members are housed in the housing 111.

During reading or writing, the optical tape 105 is run either in the forward direction by the feed motor 107 or in the reverse direction by the reverse motor 106, while those optical pickups can perform a read/write operation on the optical tape 105 at the same time. The heat generated by the optical pickups 106 is transferred to the radiator 109. The blower fan 108 blows an air to the radiator 109, thereby dissipating the heat in the radiator 109 out of the housing 111.

Figure 4:
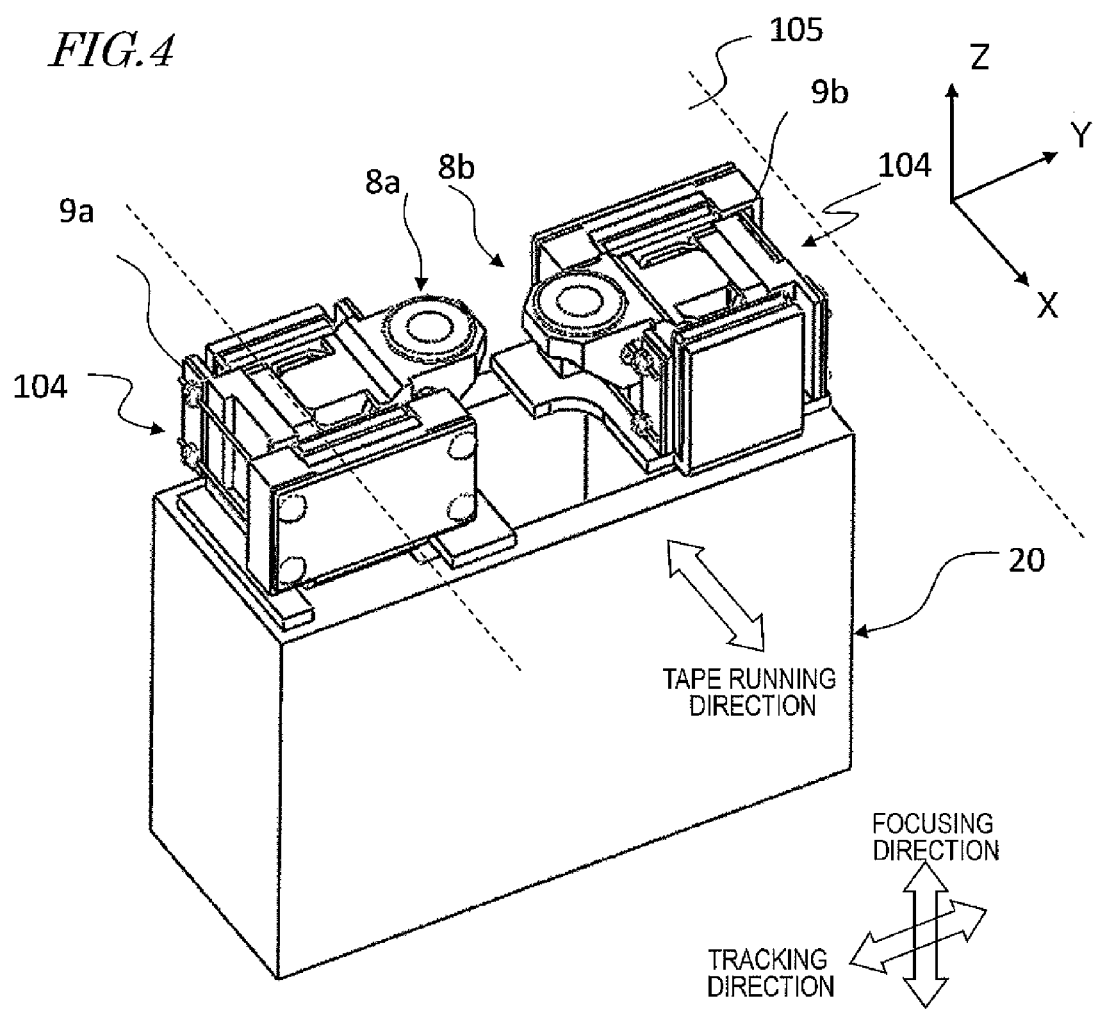
FIG. 4 is a perspective view illustrating configuration for each pickup part 6 including two optical pickups 104 according to an embodiment of the present invention.

FIG. 4 is a perspective view illustrating a configuration for each pickup part 6 according to this embodiment. In this example, two optical pickups 104 are combined with each other, and this pickup part 6 includes an optical base 20 and two lens actuators 9a and 9b that are fixed on the upper surface of that optical base 20. In other words, in the example illustrated in FIG. 4, two optical pickups 104 that can drive two objective lenses 8a and 8b independently of each other are integrated together. In FIG. 4, the edges of the optical tape 105 are indicated by the dotted lines. If a number of pickup parts 6, each having these two optical pickups 104, are arranged in the "tape running direction" shown in FIGS. 2A and 2B, it will be efficient to change the track range covered by each pair of objective lenses 8a and 8b with respect to the single optical tape 105 from one optical pickup to another.

Figure 5:
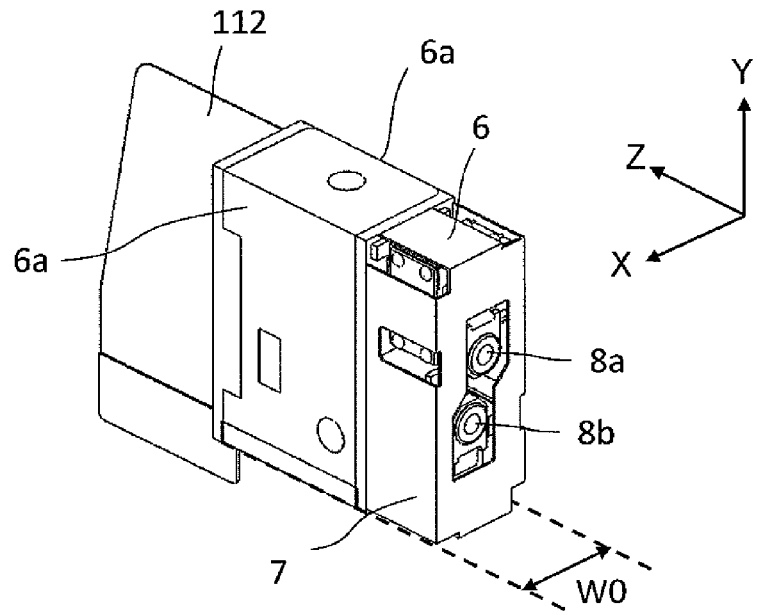
FIG. 5 illustrates a pickup part 6 including two optical pickups 104 in one case according to an embodiment of the present invention.
Figure 6:
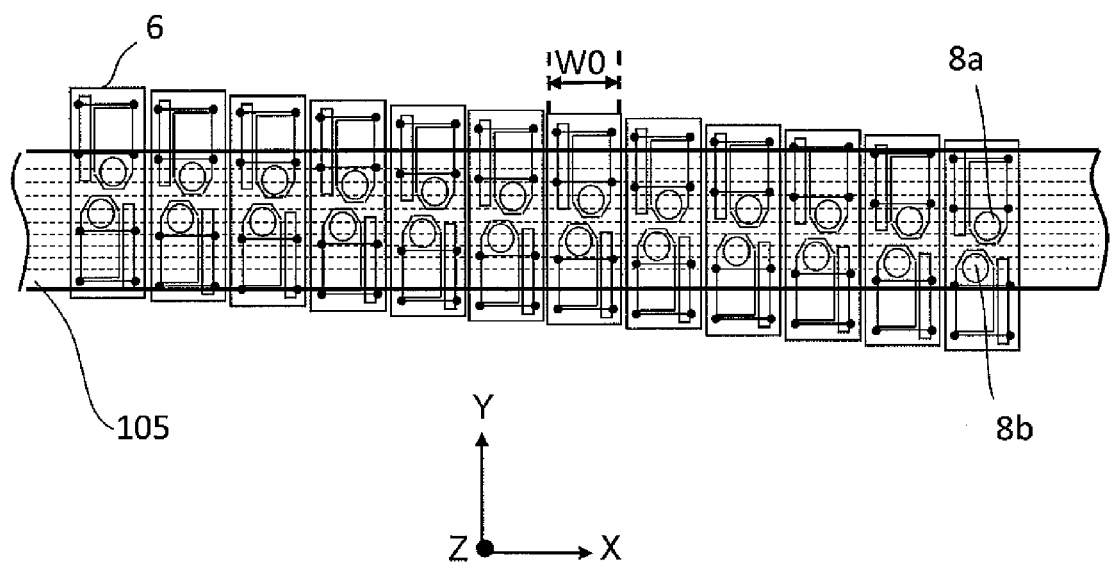
FIG. 6 is a plan view illustrating an exemplary arrangement of pickup parts 6.

FIG. 5 illustrates a pickup part 6 including the two optical pickups 104 shown in FIG. 4. This pickup part 6 includes a cover 7 that houses the two lens actuators 9a and 9b. This pickup part 6 has a generally rectangular parallelepiped shape with two parallel side surfaces 6a that define the width W0 in the tape running direction (i.e., in the X direction). A flexible printed circuit board 112 is connected to the pickup part 6 shown in FIG. 5. By arranging twelve pickup parts 6, each having such a configuration, in a direction that defines a tilt angle with respect to the tape running direction, the arrangement shown in FIG. 6 is obtained. If two lens actuators 9a and 9b are fixed on a single optical base 20 as shown in FIG. 4 and then housed in a cover 7 as shown in FIG. 5, then those two optical pickups could be regarded as a single pickup. In this description, however, the number of the optical pickups 104 is supposed to be the number of objective lenses 8 that can operate independently of each other. That is why the pickup part 6 shown in FIG. 5 is regarded herein as having two optical pickups 104. It should be noted that when the lens actuators 9a and 9b are fixed on the single optical base 20, the relative arrangement of the lens actuators 9a and 9b may be adjusted with high precision. Thus, if the arrangement shown in FIG. 6 needs to be obtained, then twelve pickup parts 6, each having the configuration shown in FIG. 5, just need to be arranged in line. In that case, it is much easier to align those twelve pickup parts 6 with each other than to arrange twenty-four totally independent optical pickups 104 in line as shown in FIG. 6.

It should be noted that the number of optical pickups 104 to be included in each pickup part 6 does not have to be two but may also be one, three, or more. In an embodiment of the present invention, the width W0 of the pickup part 6 is uniform in the Y direction as shown in FIG. 6.

If multiple optical pickups 104 are arranged in the direction in which the optical tape 105 runs, the size of each optical pickup 104 as measured in the tape running direction (i.e., in the X direction) may be as small as possible in one embodiment in order to reduce the overall size of the apparatus. Generally speaking, to store data of a huge size, a lot of optical data streamer apparatuses, each having the configuration shown in FIGS. 2A and 2B, are often housed in a multi-stage cabinet. In that case, however, each of those optical data streamer apparatuses is allowed so narrow a space that the optical data streamer apparatus may not have its size increased by its optical pickup devices 6. However, according to this embodiment, the optical pickups 104 can be arranged at a narrow pitch in the tape running direction. For example, the size of each optical pickup 104 as measured in the tape running direction may be set to be 10 mm or less.

In the optical pickups 104 shown in FIG. 4, two objective lenses 8a and 8b are arranged to face the recording surface of the optical tape 105. The distance between the respective centers of these two objective lenses 8a and 8b as measured in the tracking direction (i.e., in the Y direction) falls within the range of 4 to 8 mm, and may be set to be about 6 mm, for example. However, any other distance may be selected arbitrarily. Or the distance may vary from one position to another in the tape running direction. These two objective lenses 8a and 8b form light beam spots on two different tracks on the recording surface of the optical tape 105 and follow those tracks with the light beam spots, thereby performing read and write operations. The positions of those two objective lenses 8a and 8b may be controlled independently of each other in the focusing and tracking directions by their associated lens actuators 9a and 9b. A laser diode that emits a light beam to be condensed by the two objective lenses 8a and 8b is built in the optical base 20. In the following description, the two objective lenses 8a and 8b will sometimes be collectively referred to herein as "objective lenses 8" and the two lens actuators 9a and 9b will sometimes be collectively referred to herein as "lens actuators 9".

Figure 7A:
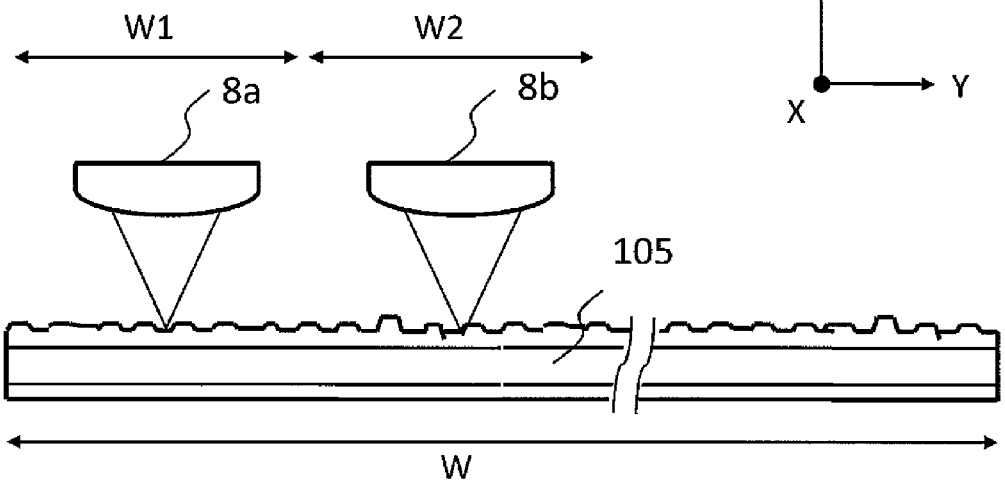
FIG. 7A is a cross-sectional view schematically illustrating objective lenses 8a and 8b that the two optical pickups 104 have.
Figure 7B:
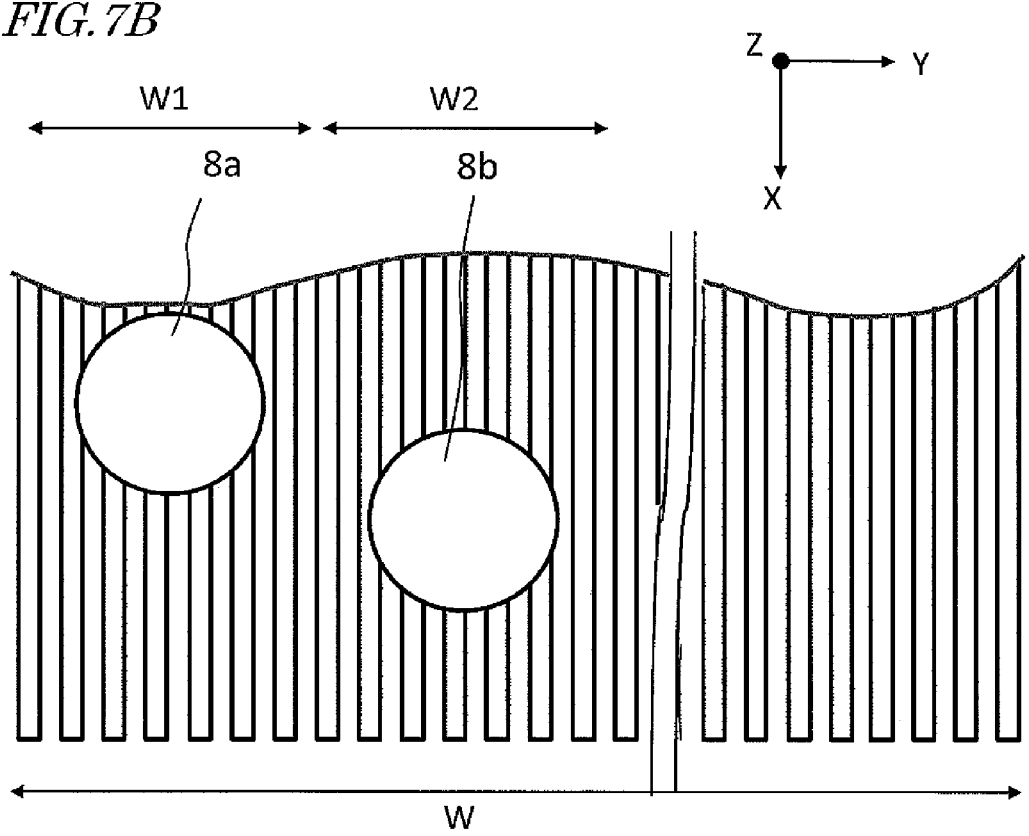
FIG. 7B is a plan view schematically illustrating an exemplary arrangement of those objective lenses 8a and 8b with respect to the surface of an optical tape 105.

FIG. 7A is a cross-sectional view schematically illustrating the objective lenses 8a and 8b that the two optical pickups 104 have and FIG. 7B is a plan view schematically illustrating an exemplary arrangement of those objective lenses 8a and 8b with respect to the surface of the optical tape 105. The positions of these objective lenses 8a and 8b are changed in the focusing direction (i.e., in the Z direction) and in the tracking direction (i.e., in the Y direction) by their lens actuator. The maximum movable ranges of the objective lenses 8a and 8b in the tracking direction (i.e., in the Y direction) are defined by the widths W1 and W2, respectively. If the objective lens 8 of each optical pickup 104 can move up to about 1 mm in the tracking direction, then every track can be covered efficiently by arranging approximately ten or more optical pickups 104 in a direction that tilts to the tape running direction with respect to an optical tape 105 with a width W of 10 mm.

The number of tracks provided for the optical tape 105 may be 38000, for example. As 24 optical pickups 104 are provided according to this embodiment, each of those optical pickups covers approximately 1600 tracks, which are arranged in an area with an overall width of 0.48 mm. In other words, each of those optical pickups 104 is arranged so as to be shifted from an adjacent one by 0.48 mm in the width direction of the optical tape 105. To access an arbitrary one of those 16000 tracks that are arranged in the area with a width of 0.48 mm, the objective lens of the optical pickup 104 moves perpendicularly to the tape running direction inside of the optical pickup 104. The objective lens can be moved in this manner by a lens actuator. As a result, the light beam spot formed on the optical tape 105 by condensing the laser beam through the objective lens can follow an arbitrary one of the tracks within that area with a width of 0.48 mm. Each of those optical pickups 104 needs to be accurately arranged at a fixed position in the width direction of the optical tape 105.

In this embodiment, the lens actuator has a maximum movable range of 0.7 mm. In this case, each optical pickup is attached so that each track on the optical tape 105 is located with an accuracy of ±0.11 mm (=±(0.7−0.48)/2 mm) with respect to the center of its associated lens. If a track position accuracy of ±0.05 mm with respect to an edge of the optical tape 105 and a lens position accuracy of ±0.03 mm with respect to the reference position of the optical pickup 104 are subtracted from that accuracy, the tolerance assigned to the data storage device becomes 0.11 mm−0.05 mm−0.03 mm=±0.03 mm. And if this tolerance is evenly assigned to the attachment accuracy of the tape guide posts 103 and that of the optical pickup 104, then the optical pickup 104 needs to be attached with an accuracy of ±0.015 mm (=0.03/2), which should ordinarily be unachievable unless a high-precision cutting process were adopted and which would be a factor in a significant rise in cost.

Meanwhile, even if the position of the optical pickup 104 varied in the tape running direction, the timing of reading or writing a signal from/on the optical tape 105 would change just slightly. That is why the positioning error of the optical pickup 104 in the tape running direction will cause no problem. The positioning mechanism of the optical pickup 104 will be described in detail later.

In an ordinary optical disc drive, only one optical pickup is used and the heat generated by that optical pickup is directly dissipated from the surface of the optical pickup itself to the air inside the optical disc drive. However, if there are as many 24 optical pickups 104 as in this embodiment, the heat could not be dissipated effectively enough by such a method. If only one optical pickup 104 or two are provided, the heat dissipating method of this embodiment does not always have to be adopted. However, if four or more optical pickups 104 are provided, it is effective to adopt the heat dissipating method of this embodiment because the method will contribute to minimizing the rise in temperature. And the arrangement of this embodiment is particularly effectively applicable to a situation where the number of optical pickups 104 provided is more than ten.

In each optical pickup 104, its laser diode and photodetector alone will dissipate a power of about 1.6 W. That is why those 24 optical pickups 104 will dissipate a power of 38.4 W (=1.6×24) in total. In one embodiment, the housing 111 has a surface area of 0.128 m$^2$ and its surface heat transfer coefficient is estimated to be 5 W/m$^2$·K. That is why were it not for the blower fan 108, the temperature rise inside the housing 111 is estimated to be at least 60° C. (=38.4/5/0.128) due to this heat generation alone. Thus, even if the air outside of this device is 20° C., the temperature inside the data storage device would be as high as 80° C. On top of that, the power would actually be dissipated by not only the laser diodes and photodetectors but also the lens actuators and the feed motor 107 that drives the optical tape 105 as well. Furthermore, if the optical data streamer apparatus was arranged in a narrow rack, the heat transfer coefficient at the surface of the housing 111 would be even smaller than 5 W/m$^2$·K. That is why the temperature inside the housing would be far higher than 80° C. and would exceed the operating temperature ranges of even normal electronic parts, to say nothing of the optical pickups 104 and the optical tape 105. Consequently, it would be impossible to ensure that the data storage device will operate properly at such a high temperature.

However, according to this embodiment, the heat generated by the optical pickups 104 is transferred to the radiator 109 that is thermally coupled to the optical pickups 104. The radiator 109 is exposed to the air blown by the blower fan 108, and therefore, can dissipate the heat generated by the optical pickups 104 out of the housing 111 purposefully. Since the radiator 109 and the blower fan 108 are provided inside of the housing 111, the heat generated by the optical pickups 104 can be dissipated very effectively from within a limited space.

Figure 8A:
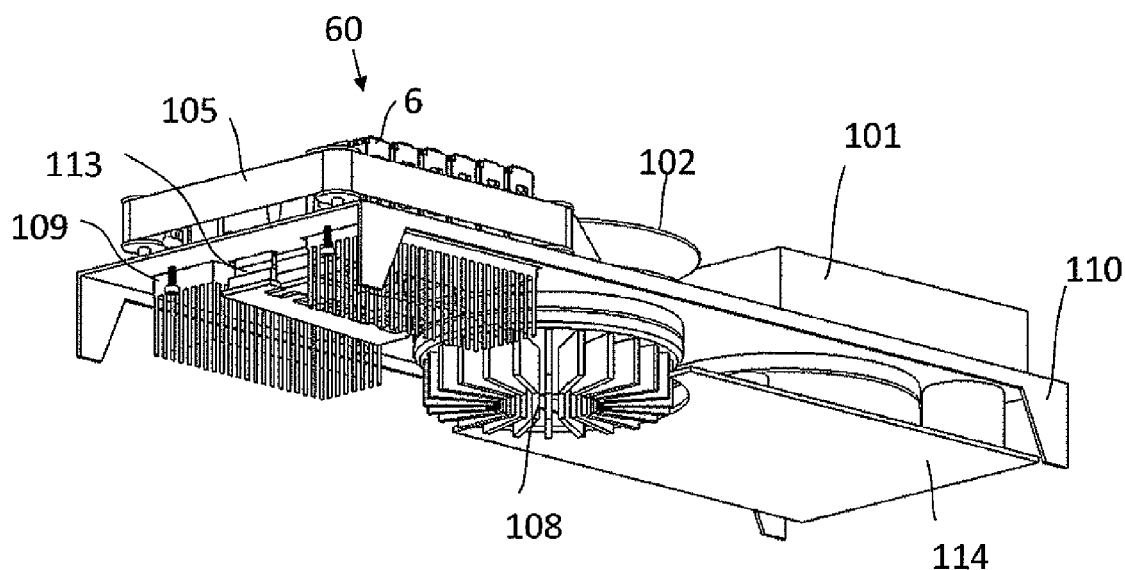
FIG. 8A is a perspective view illustrating, with the housing 111 removed, the internal configuration of a device according to an embodiment of the present invention as viewed from under the back surface thereof.
Figure 8B:
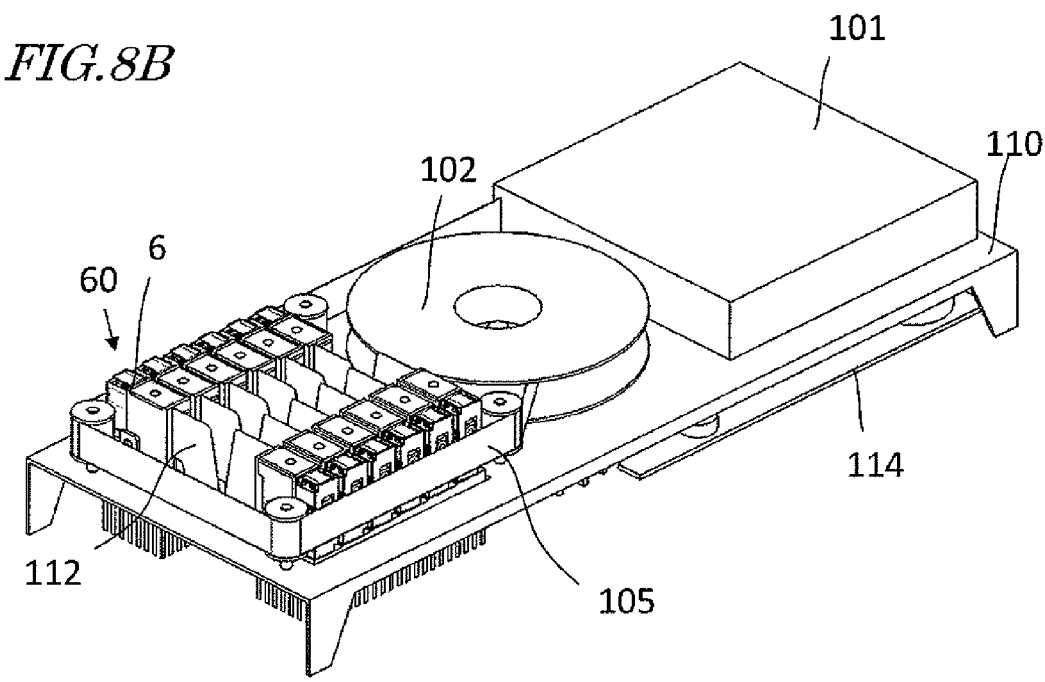
FIG. 8B is a perspective view illustrating, with the housing 111 removed, the internal configuration of the data storage device as viewed from over the upper surface thereof.
Figure 9:
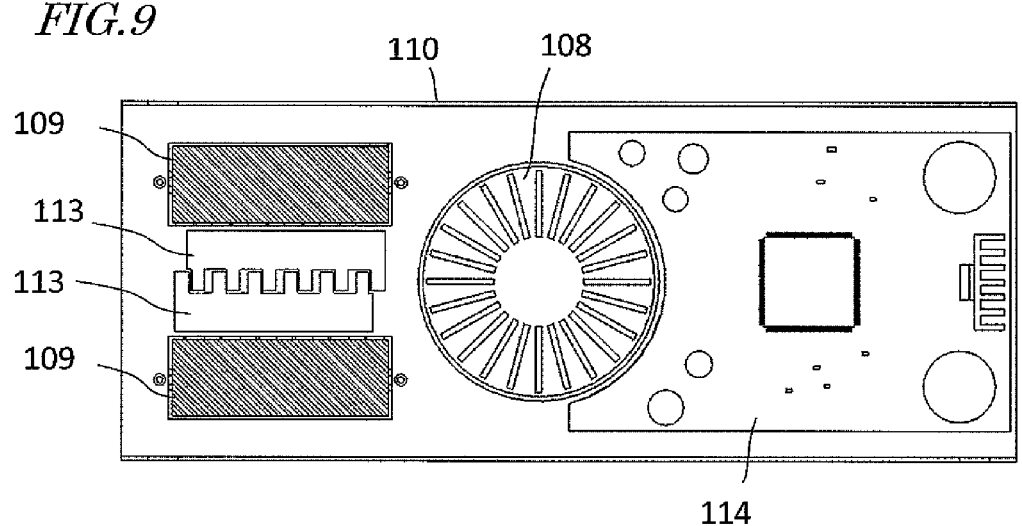
FIG. 9 illustrates an exemplary configuration for the chassis 110 as viewed from over the second space 2.

FIG. 8A is a perspective view illustrating, with the housing 111 removed, the internal configuration of the data storage device as viewed from under the back surface thereof. FIG. 8B is a perspective view illustrating that configuration as viewed from over the upper surface thereof. And FIG. 9 illustrates an exemplary configuration for the chassis 110 as viewed from over the second space 2. As shown in FIGS. 8A, 8B and 9, to the chassis 110 of this embodiment, attached are the optical pickup assembly 60, the radiator 109, a member 113 that holds the flexible printed circuit boards 112 for the optical pickups, the blower fan 108 and a circuit board 114. The circuit components shown in FIG. 3 are integrated together on the circuit board 114. The member 113 that holds the flexible printed circuit boards 112 is a relay substrate with connectors.

Figure 10:
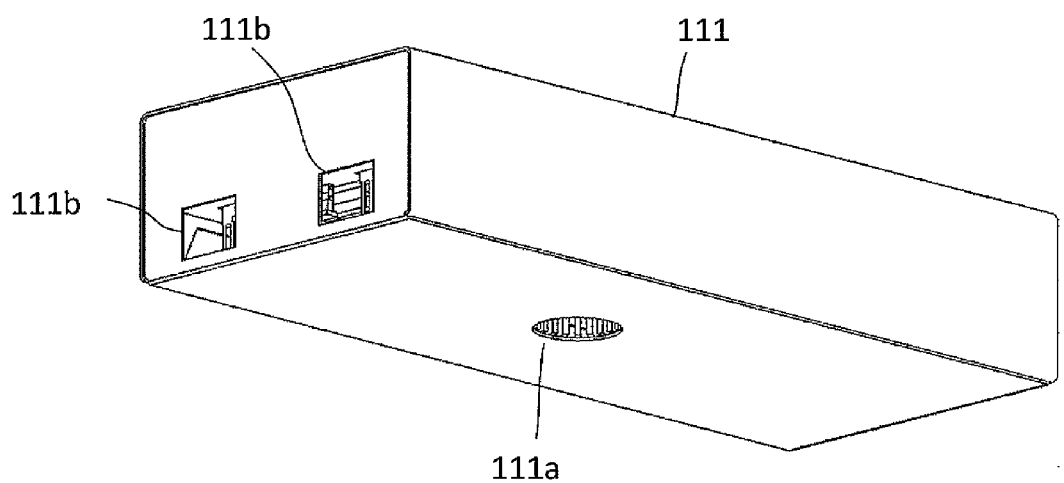
FIG. 10 is a perspective view illustrating the back surface of the housing 111 according to an embodiment of the present invention.

FIG. 10 is a perspective view illustrating the back surface of the housing 111, which has an air inlet port 111a and air outlet ports 111b. As the blower fan 108 revolves, the air flows from outside of the housing 111 into the second space 2 of the housing 111 through the air inlet port 111a. In the meantime, as the blower fan 108, the air also escapes from the second space of the housing 111 through the air outlet ports 111b. By producing such airflow, the heat inside the second space can be dissipated out of the housing 111. In this manner, the heat generated by the optical pickups 104 escapes from the housing 111 via the radiator 109. As a result, the temperature rise inside the housing 111 (mane specifically, in the optical pickups 104) can be minimized.

In this manner, the inside of the housing 111 is divided by the plate chassis 110 into the first and second spaces 1 and 2 with the optical pickups 104 and the optical tape 105 arranged in the first space 1 and with the radiator 109 and the blower fan 108 arranged in the second space. In such an arrangement, the blower fan 108 arranged in the second space 1 will attract dust from outside of the housing 111, and therefore, parts exposed to the air blown by the blower fan 108 will gather dust easily. If dust were gathered on the lens, prism and other optical parts and the laser diode of the optical pickups 104, their performance would deteriorate too much to perform the intended functions. Also, as far as the optical tape 105 is concerned, the read/write operations are performed on very small areas, which should not gather dust, either. According to this embodiment, however, the second space 2 in which the air is blown and the first space 1 in which the optical tape 105 runs are separated from each other, and therefore, dust will not enter the first space 1 easily. As a result, it is possible to prevent dust from debasing the quality of the read/write operations. In addition, according to this embodiment, the optical tape 105 is not exposed to the air blown by the blower fan 108. If the optical tape 105 were exposed to the air blown, the optical tape 105 would vibrate to possibly cause a servo disturbance in the optical pickups 104. According to this embodiment, however, such a problem can be avoided. Meanwhile, the heat can be dissipated smoothly from the optical pickups 104 in the first space 1 into the second space 2 and can also escape efficiently from the second space 2 to the outside of the data storage device. As a result, the temperature in the optical pickups 104 and their surrounding members never rises excessively and the variation in temperature in the respective parts can be minimized. Consequently, it is possible to avoid an unwanted situation where the material of the optical tape stretches or shrinks due to a temperature variation to deteriorate various characteristics.

As can be seen, according to this embodiment, the inside of the housing 111 is divided by the plate chassis 110 into the first and second spaces 1 and 2 with the optical pickups 104 and the optical tape 105 arranged in the first space 1 and with the radiator 109 and the blower fan 108 arranged in the second space 2. As a result, the optical pickups 104 and the optical tape 105 can be protected from dust, heat and air with the heat dissipated highly effectively.

To divide the inside of the data storage device into the first and second spaces 1 and 2, any other specially designed member may be arranged instead of the chassis 110. In a data storage device that uses a tape as a storage medium, a lot of guide posts and optical heads are arranged along a surface on which the tape runs. That is why it is structurally convenient to arrange a flat mounting plate. If the motor, drive mechanism and circuits that do not contact with the tape directly are arranged on the back surface of the mounting plate, the mounting plate can be used effectively. For that reason, a flat plate chassis is generally used in a tape storage device. According to this embodiment, such a chassis is used to divide the inside of the data storage device into the first and second spaces 1 and 2. Then, the inside of the housing 111 can be divided into the first and second spaces 1 and 2 without using any special member and the optical pickups 104 and the optical tape 105 can be shielded from dust, heat and air.

As described above, according to this embodiment, the heat can be dissipated highly effectively and the optical pickups 104 and the optical tape 105 can shielded from dust, heat and air. As a result, a highly reliable data storage device can be provided at a reasonable cost.

Next, an optical pickup positioning mechanism according to this embodiment will be described.

Figure 11:
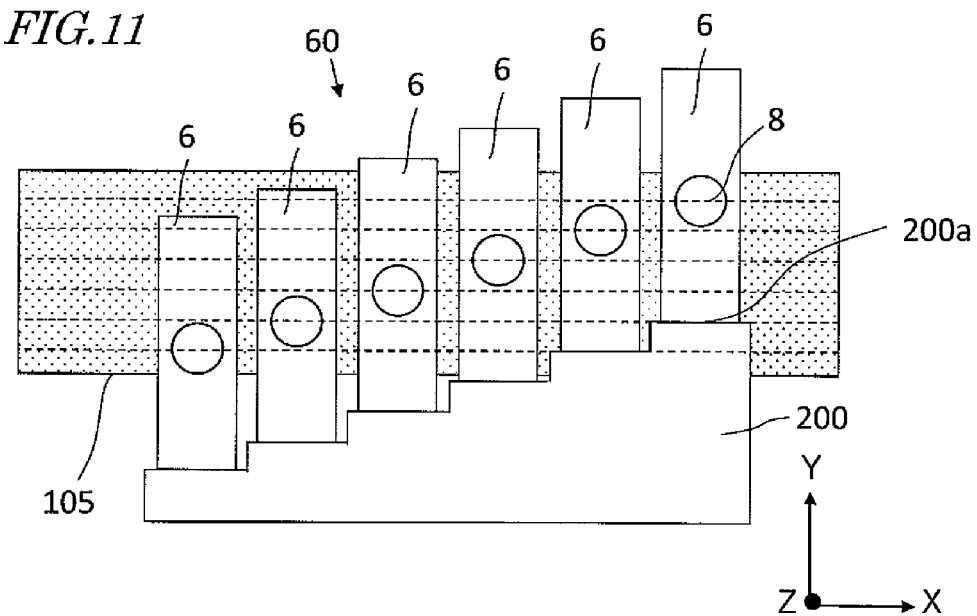
FIG. 11 illustrates an exemplary positioning member 200 that positions the pickup parts 6 and also illustrates those pickup parts 6 that have been positioned by the positioning member 200.

FIG. 11 illustrates an exemplary positioning member 200 that positions the pickup parts 6 and also illustrates those pickup parts 6 that have been positioned by the positioning member 200. In this example, each single pickup part 6 is supposed to include only one optical pickup for the sake of simplicity. Naturally, however, each pickup part 6 may also include two or more optical pickups. In FIG. 11, the circle illustrated at the center of each pickup part 6 indicates the position of its objective lens 8. The center of each objective lens 8 is located right over one of the dashed lines drawn on the optical tape 105. In the exemplary arrangement illustrated in FIG. 11, each pickup part 6 is arranged at its intended position with high accuracy.

Figure 12:
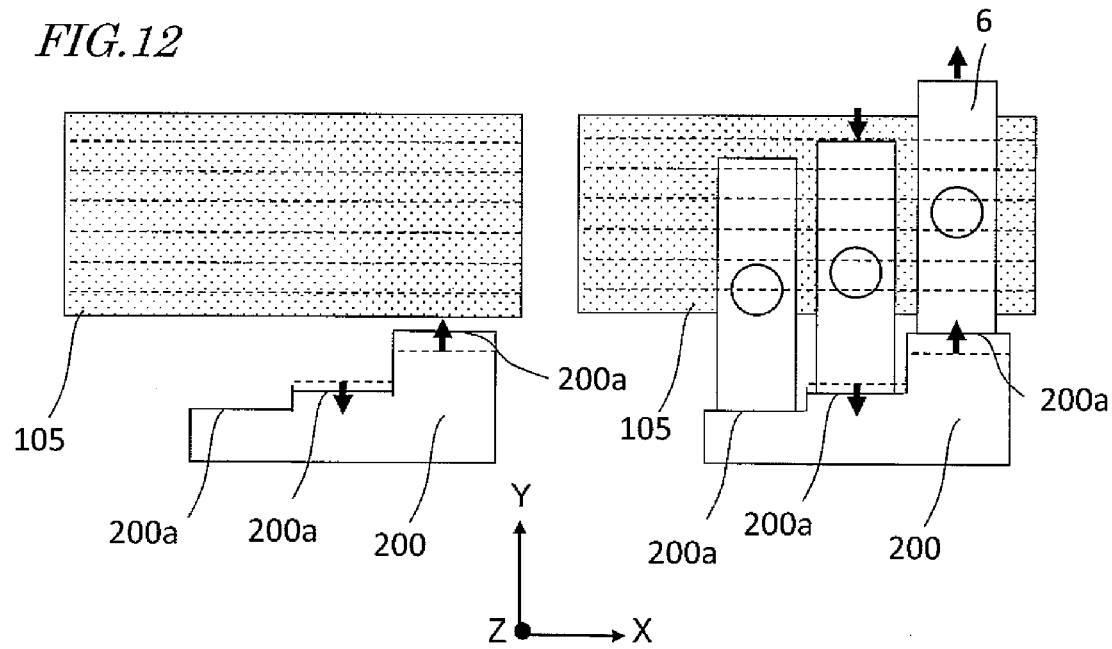
FIG. 12 is a plan view illustrating a portion of the positioning member 200 in a situation where the positions of the contact surfaces 200a have shifted in the Y direction (i.e., perpendicularly to the X direction in which the optical tape 105 runs).
Figure 13:
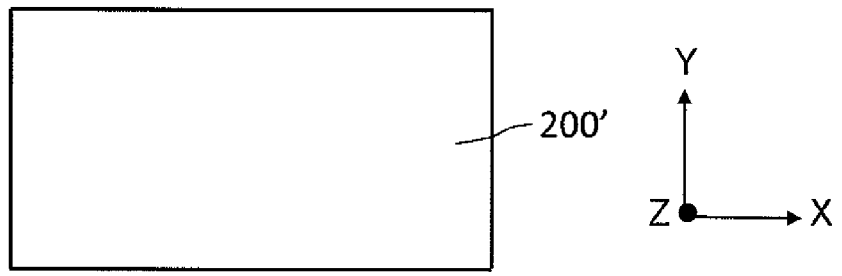
FIGS. 13(a) through 13(d) are cross-sectional views schematically illustrating respective process steps in which the positioning member 200 changes its shape while a material block 200' is machined into the shape of the positioning member 200.
Figure 13:
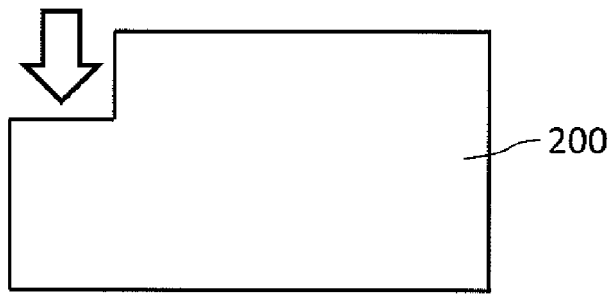
Figure 13:
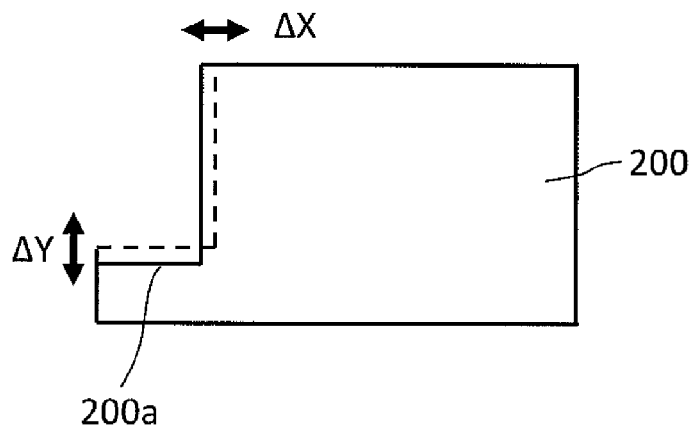
Figure 13:
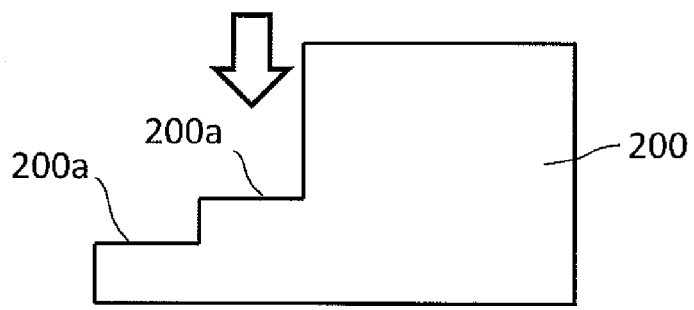

As will be described later, depending on the precision of machining when the positioning member 200 is made, the surfaces 200a of the positioning member 200 that contact with the pickup parts 6 (which will be referred to herein as "contact surfaces") may shift from their target positions that are determined during the design process. FIG. 12 illustrates a situation where the positions of the contact surfaces 200a have shifted in the Y direction (i.e., perpendicularly to the X direction in which the optical tape 105 runs). If the position of a contact surface 200a shifts in the Y direction from its target position indicated by the dashed line, the Y-direction position of the pickup part 6 that contacts with the contact surface 200a also shifts. As a result, the position of the objective lens 8 of that pickup part 6 also shifts in the Y direction from its target position.

FIGS. 13(a) through 13(d) illustrate schematically how a metallic material block 200' is machined into the shape of the positioning member 200.

Specifically, FIG. 13(a) illustrates the material block 200'. FIG. 13(b) illustrates how to form a deep step by cutting part of the material block 200' away with a milling machine, for example. FIG. 13(c) illustrates how one contact surface 200a has been formed in the positioning member 200. In this case, due to the precision of the machining process to form that contact surface 200a, the Y-direction position of the contact surface 200a has shifted by ΔY from the target position indicated by the dashed line. In the meantime, the X-direction position of the contact surface 200a has also shifted by ΔX from the target position indicated by the dashed line.

FIG. 13(d) illustrates how another step and another contact surface 200a have been formed by carrying out similar machining process. By repeatedly performing such a machining process a number of times, a positioning member 200 with multiple contact surfaces 200a that are arranged stepwise is completed. In order to increase the positioning accuracy, such high-precision machining process needs to be carried out over and over again.

If a lot of pickup parts 6 should be arranged highly accurately using such a positioning member 200, the cost would increase significantly. On top of that, the intended accuracy could not be achieved due to accumulation of errors. Thus, to overcome such a problem, according to this embodiment, the positioning mechanism to be described below is adopted.

Figure 14:
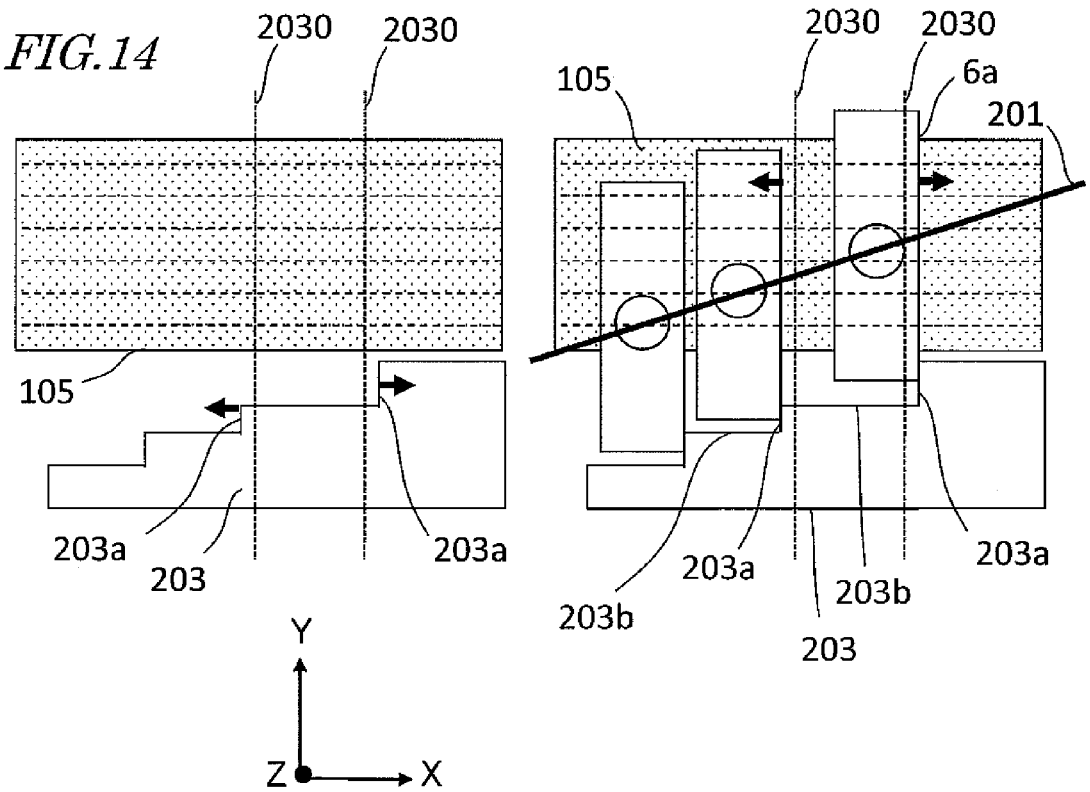
FIG. 14 illustrates a mounting shaft 201, pickup parts 6 attached to that mounting shaft 201, and a positioning member 203 that determines the positions of the pickup parts 6 in the tape running direction.

FIG. 14 illustrates a mounting shaft 201 (which will be referred to herein as a "first regulating member 201") that runs in a direction that defines a tilt angle with respect to the tape running direction (i.e., the X direction), the pickup parts 6 that are attached to that mounting shaft 201, and another regulating member 203 (which will be referred to herein as a "second regulating member") that determines the positions of the pickup parts 6 in the tape running direction.

Each of those pickup parts 6 has either a hole to pass the mounting shaft 201 through or a guide to guide the mounting shaft 201. Each pickup part 6 can slide in the direction in which the mounting shaft 201 runs. In other words, each pickup part 6 is regulated so as to be movable with one-dimensional degree of freedom in the direction in which the mounting shaft 201 runs. As long as the mounting shaft 201 can allow the pickup parts 6 to slide linearly on it, the mounting shaft 201 may have a rod shape, a flat plate shape or any other appropriate shape and may also have a circular, elliptical or polygonal (which may be triangular or quadrilateral) cross section.

The positioning member 203 has a plurality of surfaces, each of which contacts with an associated one of the pickup parts 6 so as to regulate the movement of the pickup part 6 in the tape running direction (i.e., in the X direction) and which will be referred to herein as a "contact surface 203a". The contact surface 203a contacts with the side surface 6a of an associated one of the pickup parts 6, thereby determining the position of that pickup part 6 in the tape running direction. In the example illustrated in FIG. 14, the positioning member 203 has a stepped surface (which will be referred to herein as a "counter surface" 203b) so as to face the respective pickup parts 6. However, this counter surface 203b does not contact with any pickup part 6 and there is a gap between the counter surface 203b and the pickup parts 6. In other words, the positioning member 203 does not regulate by itself the positions of the respective pickup parts 6 in the Y direction that is perpendicular to the X direction in which the tape runs. To regulate the positions of the respective pickup parts 6 in the Y direction, the mounting shaft 201 is needed.

FIG. 14 illustrates a situation where the contact surfaces 203a of the positioning member 203 have shifted from their target positions 2030 in the X direction in which the tape runs (indicated by the dotted lines) to the directions indicated by the arrows. Such shifts are caused due to the dimensional error that inevitably occurs when the positioning member 203 is formed by machining process. The magnitude of that shift corresponds to ΔX shown in FIG. 13 but is exaggerated in FIG. 14.

By using the mounting shaft 201 and the positioning member 203 in combination, those pickup parts 6 can be positioned. If the tilt angle of the mounting shaft 201 is changed when each pickup part 6 contacts with its associated contact surface 203a of the positioning member 203, each pickup part 6 can have its position in the tape running direction (i.e., in the X direction) fixed and can have its position in the Y direction that is perpendicular to the X direction adjusted with high precision. After having been positioned in this manner, each pickup part 6 is fixed while keeping in contact with the contact surface 203a of the positioning member 203. That is to say, the position of that pickup part 6 does not change while the data storage device is operating. In one embodiment of the present invention, however, even after the optical pickup assembly 60 has been mounted on the chassis 110, for example, the tilt angle of the mounting shaft 201 could also be changed. The pickup assembly 60 may be readily attachable and removable. Or the data storage device may also be designed so that each pickup part 6 is readily attachable and removable to/from the optical pickup assembly 60. In a situation where a lot of optical pickups are provided as in this embodiment, even if any of those optical pickups has gone out of order, just the pickup part including that optical pickup in question needs to be replaced with a new one. Then, there will be no need to replace the entire optical pickup assembly 60 with a brand new one anymore.

Figure 15:
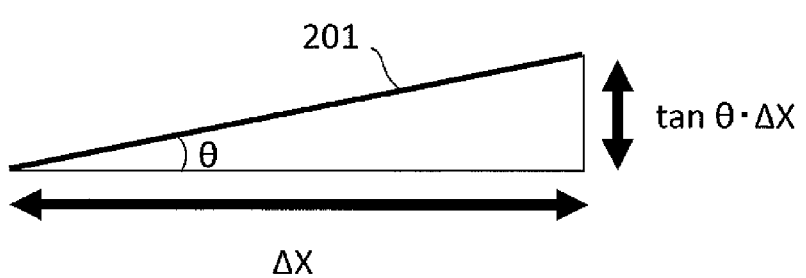
FIG. 15 shows a relation between ΔX and ΔY.

During the positioning process, the pickup parts 6 may move only parallel to the mounting shaft 201. That is why if the position of one pickup part 6 has shifted by ΔX within the range of machining precision in the tape running direction (i.e., in the X direction), then the position of that pickup part 6 will shift by $\tan\theta\cdot\Delta X$ in the Y direction that is perpendicular to the X direction as shown in FIG. 15. In this case, θ is the angle defined by the direction in which the mounting shaft 201 runs with respect to the tape running direction (i.e., the X direction). That is to say, θ is the tilt angle of the mounting shaft 201 and is expressed in radians. If the pickup parts 6 are arranged within a length of 100 mm of the optical tape 105 that has a width of 10 mm, the tilt angle θ of the mounting shaft 201 may be set to be equal to the vertex angle of a right triangle that has a height of 10 mm and a base length of 100 mm. In that case, tan θ becomes equal to 0.1, and therefore, the positional shift in the Y direction can be reduced to one tenth of Δx. Typically, tan θ is approximately 0.04 (=0.48/12). That is why according to this embodiment, the positional shift in the Y direction can be reduced to one twenty-fifth (=0.04) or less of the machining precision (ΔX). Consequently, by adopting this arrangement, the positioning accuracy of the pickup part 6 can be increased in the Y direction that is perpendicular to the tape running direction.

In the example illustrated in FIG. 14, there is a gap between the positioning member 203 and the respective pickup parts 6. That is why in order to transfer heat from those pickup parts 6 to the radiator 109 smoothly, the gap may be filled with a material with high thermal conductivity (i.e., a heat transfer material) in one embodiment. Alternatively, the positioning member 203 may also be used as part or all of the radiator 204. In that case, the positioning member 203 may be made of a metallic material with high thermal conductivity. Still alternatively, the pickup parts 6 and the radiator 109 may also be thermally coupled together using a different member from the positioning member 203. In that case, the positioning member 203 does not have to work as a member that conducts the heat, and therefore, may also be made of a material with low thermal conductivity.

Figure 16:
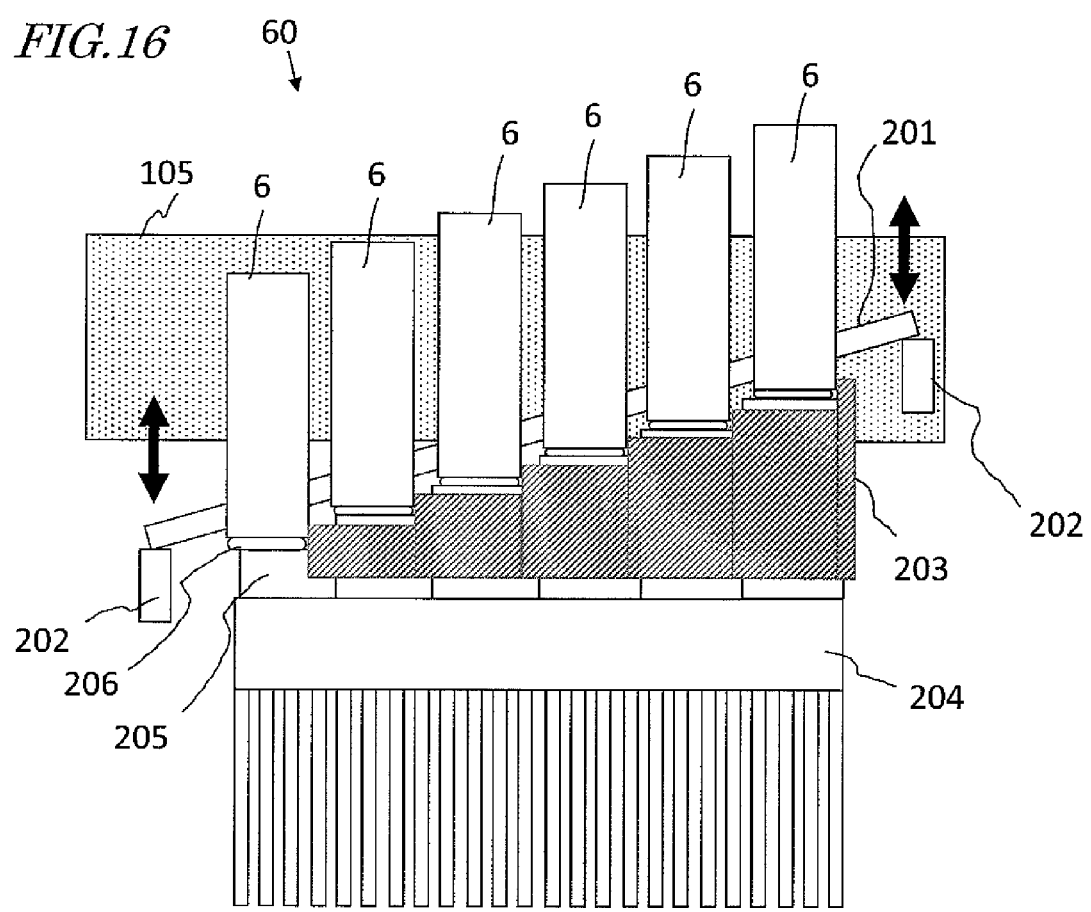
FIG. 16 illustrates an exemplary configuration for an optical pickup assembly 60 in one embodiment of the present invention.

FIG. 16 illustrates an exemplary configuration for the optical pickup assembly 60 in one embodiment of the present invention. In this example, the mounting shaft 201 runs through six pickup parts 6, and the pickup parts 6 and the radiator 204 are thermally coupled together via a thermally conductive material 205 with a stepped counter surface. Also, in order to position the pickup parts 6, the positioning member 203 is additionally used separately from the thermally conductive material 205. The positioning member 203 is made of a thin plate (with a thickness of 1 to 2 mm, for example) that spreads in a plane that is parallel to the XY plane, and is stacked in the Z direction on the thermally conductive material 205. In this example, the positions of the pickup parts 6 are also determined by the mounting shaft 201 and the positioning member 203 in combination.

In the example illustrated in FIG. 16, each of the positioning member 203 and the thermally conductive material 205 has a surface that confronts the pickup parts 6. These counter surfaces do not contact with the pickup parts 6 and there is a gap between the counter surfaces and the pickup parts 6, which may be filled with a heat transfer material 206 with flowability and thermal conductivity. Through that heat transfer material 206, the heat flows from the pickup parts 6 to the thermally conductive material 205 and the radiator 204. In order to cool the air more efficiently, the radiator 204 may have a lot of fins or rods.

Figure 17:
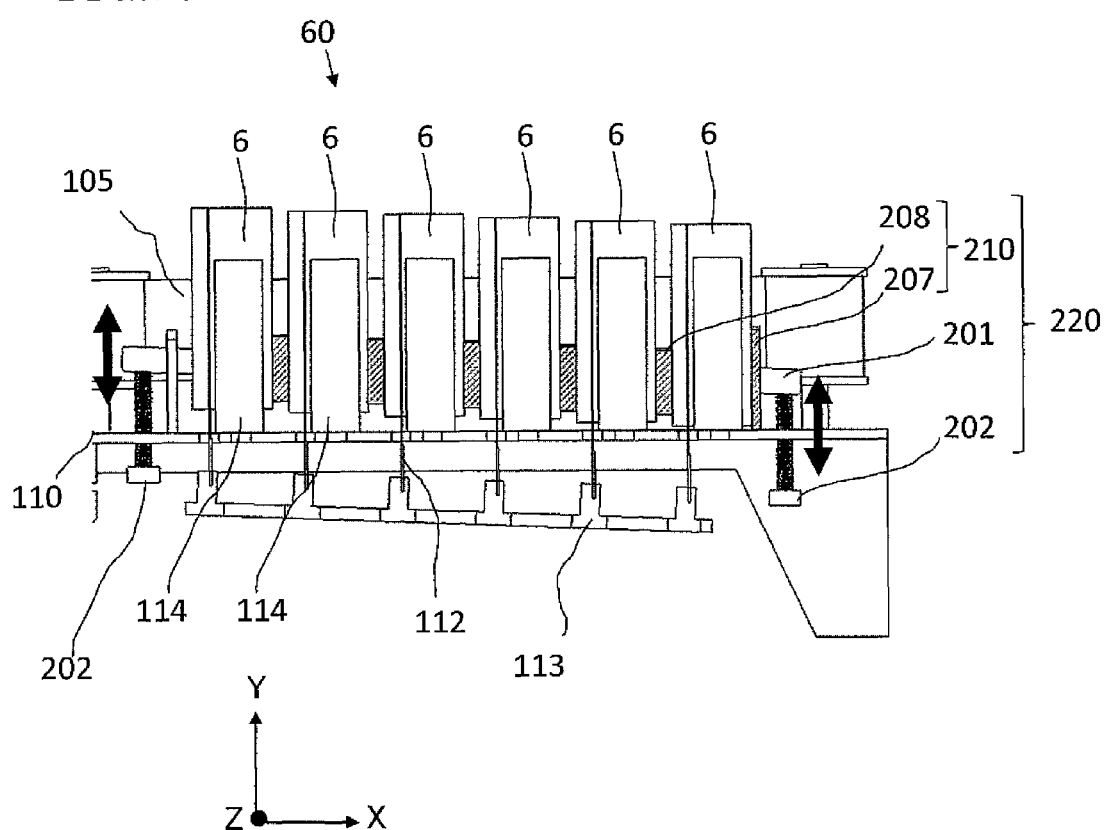
FIG. 17 is a plan view illustrating an exemplary configuration for another optical pickup assembly 60.
Figure 18:
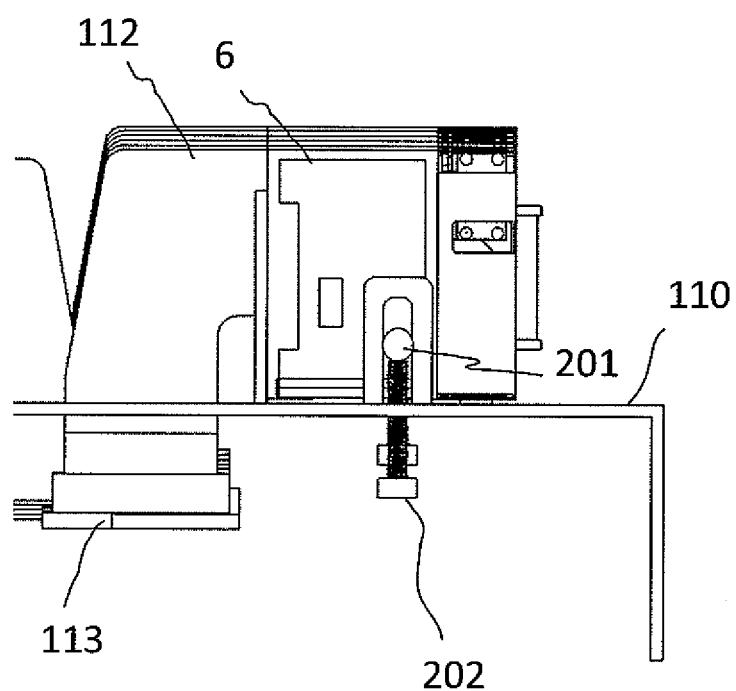
FIG. 18 is a side view of the optical pickup assembly 60 shown in FIG. 17.
Figure 18:
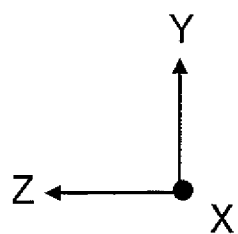

Hereinafter, another exemplary configuration for the positioning mechanism will be described with reference to FIGS. 17 and 18. FIG. 17 is a plan view illustrating an exemplary configuration for the optical pickup assembly 60 and FIG. 18 is a side view thereof. The optical pickup assembly 60 illustrated in FIGS. 17 and 18 is mounted on the chassis 110.

This optical pickup assembly 60 includes a number of pickup parts 6 and a positioning mechanism 220 that positions those pickup parts 6. The positioning mechanism 220 includes a mounting shaft 201 (i.e., the first regulating member) on which the respective pickup parts 6 are mounted, a positioning member 201 that positions those pickup parts 6 parallel to the tape running direction, and fixing jigs 202 that fix the mounting shaft 201 in a direction that tilts with respect to the tape running direction. The mounting shaft 201 is made of an inexpensive rod material with a good degree of straightness such as a polished rod. Each of those pickup parts 6 has a hole, into which the mounting shaft 201 can be fitted perfectly and through which the mounting shaft 201 runs. The fixing jigs 202 are arranged so as to adjust the position of the mounting shaft 201 at or around both ends thereof and to change the tilt angle of the mounting shaft 201.

A tilt regulating member 114 forms an integral part of the chassis 110, contacts with the rear surface of those pickup parts 6, and regulates the rotation of the pickup parts 6 on the mounting shaft 201. Since the respective surfaces of the tilt regulating member 114 that contact with their associated rear surfaces of the pickup parts 6 are formed simultaneously through a press process, those and other surfaces of the tilt regulating member 114 have a good degree of planarity. As a result, the variation in the height of the objective lenses of the pickup parts 6 due to the rotation of the pickup parts 6 on the mounting shaft 201 is negligible, if any.

The positioning member 210 includes an edge positioning member 207 that determines the position of one of the pickup parts 6, which is located at one end, in the tape running direction, and a number of spacers 208, each of which is inserted into the gap between its associated pair of pickup parts 6 to position those pickup parts 6 in the tape running direction. Those pickup parts 6 are arranged in close contact with each other with those spacers 208 interposed between them. The spacers 208 can be made at a low cost by pressing a plate metal with a uniform thickness. The respective widths of the pickup parts 6 and the spacers 208 are determined so that if the tilt angle of the mounting shaft 201 is adjusted to an appropriate value, the respective objective lenses 8 of the pickup parts 6 are located at proper positions in the width direction of the optical tape 105. The respective widths of the pickup parts 6 are highly uniform, so are those of the spacers 208. That is why by using the edge positioning member 207 and the spacers 208 in combination, the position of each of those pickup parts 6 in the tape running direction can be regulated highly accurately. That is to say, if the tilt angle of the mounting shaft 201 is finely adjusted with the fixing jigs 202, the position of each of those pickup parts 6 can be adjusted highly precisely perpendicularly to the tape running direction.

According to this embodiment, the tilt angle of the mounting shaft 201 is determined by the mounting pitch (of 12 mm, for example) of the pickup parts 6 in the tape running direction and their size difference (of 0.48 mm, for example) in the width direction of the optical tape 105. Although the pickup parts 6 needs to be mounted with an accuracy of as high as ±0.015 mm in the width direction of the optical tape 105, the mounting accuracy in the direction in which the optical tape 105 runs may be ±0.375 mm (=0.015×12/0.48 mm) due to that small tilt. This is an accuracy that can be achieved easily enough by ordinary cheap resin molding or plate metal pressing process.

Since the position and tilt angle of the mounting shaft 201 can be adjusted with the fixing jigs 202, even higher accuracy can be achieved if necessary. The fixing jigs 202 are used to adjust the height of the mounting shaft 201 at both ends thereof, and therefore, may be made up of an adjusting screw, a pressure spring and a guide, for example. That is why those optical pickups 104 can be mounted highly accurately using a cheap positioning member. Although the height and tilt of the mounting shaft 201 are supposed to be adjusted with the fixing jigs 202, the mounting shaft 201 may also be fixed with a high-precision member without making such adjustments.

Figure 19:
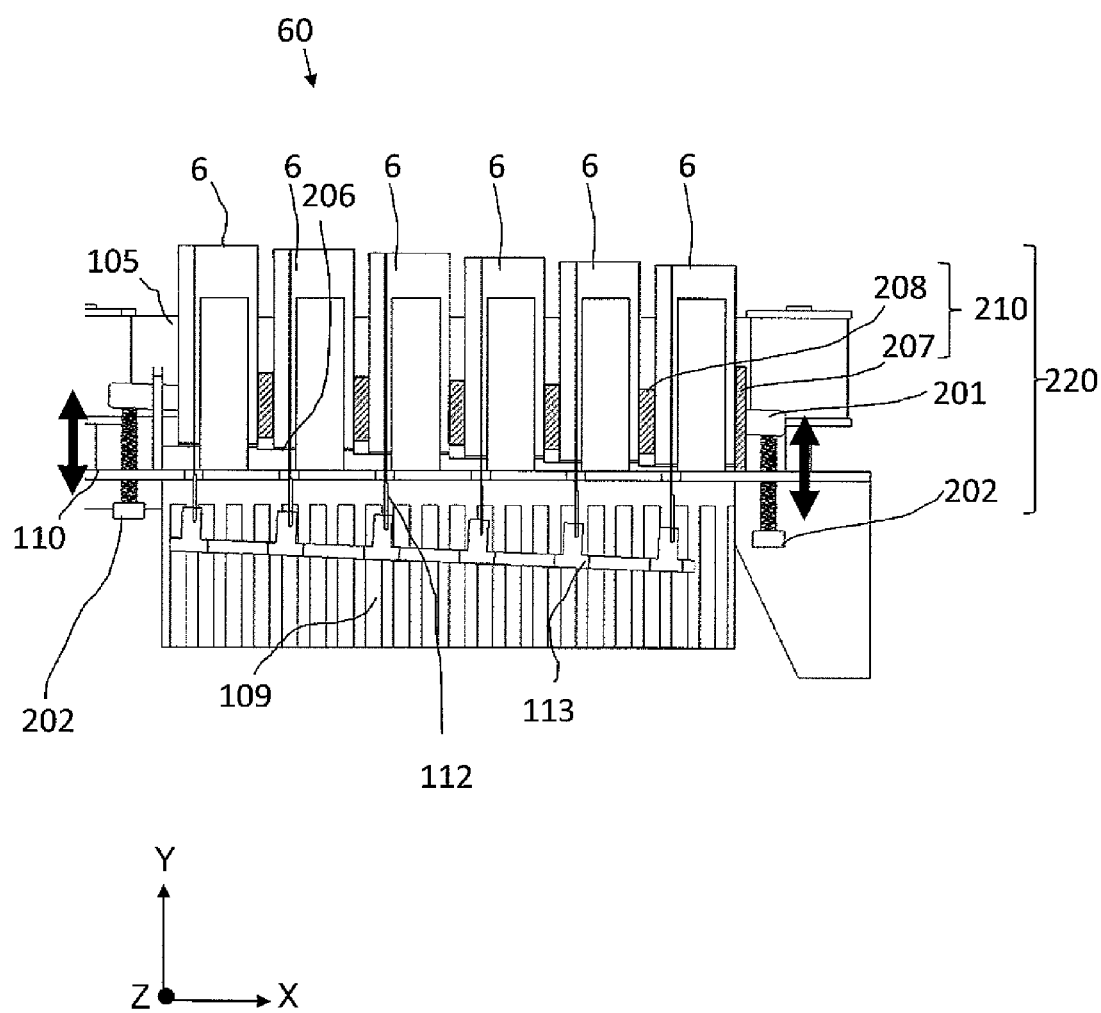
FIG. 19 is a plan view illustrating a modified configuration for the optical pickup assembly 60.
Figure 20:
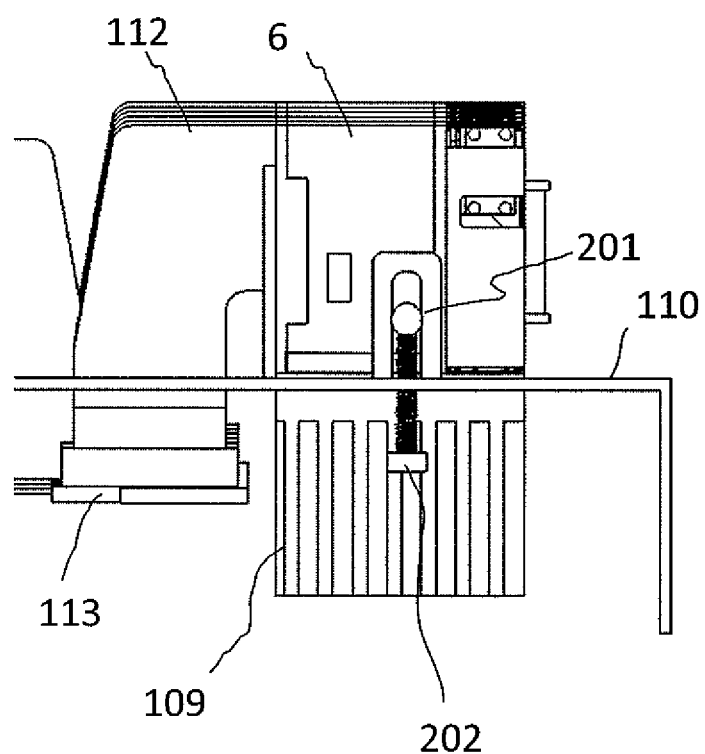
FIG. 20 is a side view of the optical pickup assembly 60 shown in FIG. 19.

Next, look at FIGS. 19 and 20. The optical pickup assembly 60 illustrated in FIGS. 19 and 20 basically have the same configuration as its counterpart shown in FIGS. 17 and 18. Their difference is that the optical pickup assembly 60 shown in FIGS. 19 and 20 is thermally in contact with the radiator 109.

The upper portion of the radiator 109 has a stepped counter surface so as to leave a gap between that counter surface and the respective pickup parts 6 that are positioned with the fixing jigs 201. That gap works so as to prevent the stepped counter surface of the radiator 109 from interfering with positioning those pickup parts 6. That is to say, the radiator 109 does not mechanically contact with the pickup parts 6, and therefore, does not regulate the positions of the pickup parts 6. That is why the machining accuracy of the radiator 109 does not affect the positioning accuracy of the pickup parts 6. Since the stepped counter surface of the radiator 109 does not need high size accuracy in this manner, the radiator 109 can be made at a low cost.

The gap between the radiator 109 and the pickup parts 6 is filled with a heat transfer material 206, thereby achieving thermal contact between them. The heat transfer material 206 may be made of thermal grease, for example. The thermal grease is a liquid material with high viscosity and high thermal conductivity. The heat transfer material 206 thermally couples the pickup parts 6 and the radiator 109 together, and therefore, conducts the heat that has been generated by the optical pickups 104 to the radiator 109.

Figure 21:
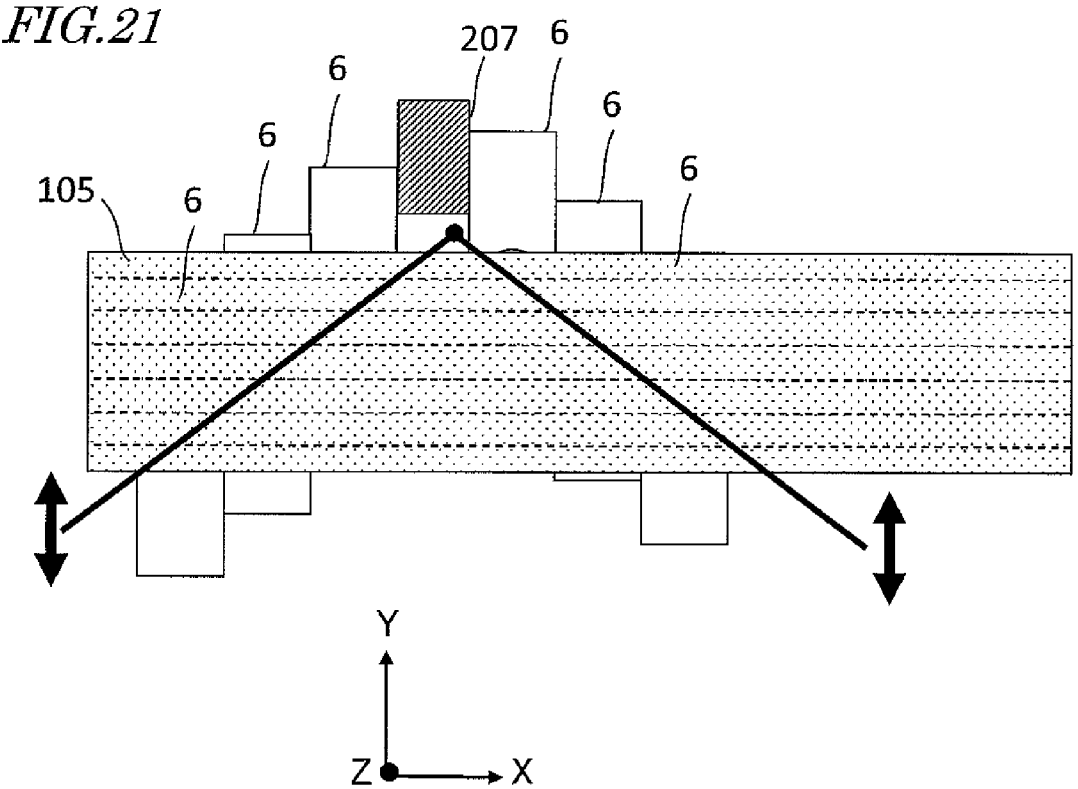
FIG. 21 schematically illustrates a modified example of the positioning mechanism.

FIG. 21 generally illustrates another exemplary configuration for a positioning mechanism. A single optical pickup assembly may have multiple mounting shafts 201. In the example shown in FIG. 21, two mounting shafts 201 position the pickup parts 6 at two different tilt angles. Also, in this example, one spacer 207 is inserted between two central ones of the pickup parts 6, while the other pickup parts 6 are adjacent to, and directly in contact with, each other.

In the embodiments of the present invention described above, the inside of the housing 111 is supposed to be divided into the first and second spaces 1 and 2 by the chassis 110. However, any other member such as a portion of the housing 111 may be used instead for that purpose. Alternatively, a member that is specially designed to divide the inside of the housing 111 into multiple spaces may also be arranged. It should be noted that the first and second spaces 1 and 2 do not have to be separated from each other airtight (i.e., so that no gases flow between them at all). Rather the first and second spaces 1 and 2 just need to be separated from each other to the point that almost no dust will enter the first space 1 from the second space 2. Optionally, a filter that filters out dust may be provided for either a portion of the chassis 110 or in the gap between the chassis 110 and the housing 111.

Also, although a hole is cut through the chassis 110 to make the upper portion of the radiator 109 contact with the pickup parts 6 in the embodiments described above, the heat may also be transferred through the thickness of the chassis 110 with no holes cut through it. In that case, the chassis 110 may also be made of aluminum or any other good thermal conductor and may perform a part or even all of the function of the radiator. In such a situation, to avoid transferring the heat in the in-plane direction of the chassis 110, a region of the chassis 110 to which the optical pickup assembly is attached may be surrounded with holes. Then, some measure needs to be taken to prevent dust from entering the first space 1.

Furthermore, in the embodiment described above, the blower fan 108 is supposed to be driven by the motor 107 that drives the winding spool 102. However, another motor dedicated to driving the blower fan 108 may also be provided. Also, depending on the quantity of the heat generated by the optical pickup 104, the blower fan 108 may be omitted as well.

Furthermore, in the embodiment described above, an optical tape is supposed to be used as a storage medium. However, the storage medium does not have to be an optical tape but may also be an optical disc as well.

The present invention is applicable for use in a data storage device such as an optical data streamer apparatus.

While the present invention has been described with respect to embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

This application is based on Japanese Patent Applications No. 2011-188428 filed Aug. 31, 2011 and No. 2012-032295 filed Feb. 17, 2012, the entire contents of which are hereby incorporated by reference.

What is claimed is:

1. A data storage device comprising:
   a housing;
   a plate member that divides the inside of the housing into first and second spaces;
   a plurality of optical pickups arranged in the first space and configured to write data on a storage medium in the first space, the storage medium being a tape medium; and
   a heat radiating member which transfers the heat that has been generated by the optical pickup to the second space.

2. The data storage device of claim 1, wherein the housing has a plurality of openings, through which the second space communicates with the outside of the data storage device.

3. The data storage device of claim 1, wherein the plurality of optical pickups are arranged at regular intervals.

4. The data storage device of claim 3, further comprising:
   guide posts that guide the tape medium in the first space;
   a spool that winds the tape medium in the first space; and
   a motor that rotates the spool, and
   wherein the optical pickups are arranged in a direction in which the tape medium runs.

5. The data storage device of claim 3, wherein the optical pickups are arranged at mutually different positions in the width direction of the tape medium.

6. The data storage device of claim 5, wherein the optical pickups are secured to a flat plate or a straight rod member that tilts in the width direction of the tape medium.

7. The data storage device of claim 1, wherein the heat radiating member is at least partially exposed in the first space.

8. The data storage device of claim 3, wherein a gap is left between the heat radiating member and each of the optical pickups and is filled with a thermally conductive material with flowability.

9. The data storage device of claim 1, wherein the plate member is arranged to support the optical pickups and the heat radiating member.

10. The data storage device of claim 9, wherein the plate member functions as at least a part of the heat radiating member.

11. The data storage device of claim 3, wherein the optical pickups are attachable and removable to/from the data storage device.

12. The data storage device of claim 7, wherein the plate member has a hole, through which the heat radiating member is thermally coupled to the optical pickups.

13. The data storage device of claim 1, further comprising a blower fan which is arranged in the second space,
   wherein the heat generated by the optical pickups is dissipated out of the data storage device with the air blown by the blower fan.

* * * * *